(12) United States Patent
Yap et al.

(10) Patent No.: US 11,782,781 B1
(45) Date of Patent: Oct. 10, 2023

(54) USER INTERFACE EVENT IMPACT ANALYSIS

(71) Applicant: FullStory, Inc., Atlanta, GA (US)

(72) Inventors: Jaime Michael Yap, Atlanta, GA (US); Aditya Santosh Kulkarni, Atlanta, GA (US); Charles Mell Lay, Smyrna, GA (US)

(73) Assignee: FullStory, Inc., Atlanta, GA (US)

( * ) Notice: Subject to any disclaimer, the term of this patent is extended or adjusted under 35 U.S.C. 154(b) by 265 days.

(21) Appl. No.: 16/236,095

(22) Filed: Dec. 28, 2018

(51) Int. Cl.
*G06F 11/00* (2006.01)
*G06F 11/07* (2006.01)
*G06F 11/30* (2006.01)
*G06F 9/451* (2018.01)
*H04L 67/14* (2022.01)

(52) U.S. Cl.
CPC ............ *G06F 11/0778* (2013.01); *G06F 9/451* (2018.02); *G06F 11/079* (2013.01); *G06F 11/3089* (2013.01); *H04L 67/14* (2013.01)

(58) Field of Classification Search
CPC ... G06F 11/0778; G06F 11/079; G06F 11/3089; G06F 11/3065; G06F 11/3072; G06F 11/321; G06F 11/323; G06F 11/324; G06F 11/3466; G06F 11/3476; G06F 9/451; H04L 67/14; H04L 67/141; H04L 67/142; H04L 67/146; H04L 67/22; G06Q 30/02; G06Q 30/0201; G06Q 30/0242; G06Q 30/0243; G06Q 30/0241
See application file for complete search history.

(56) References Cited

U.S. PATENT DOCUMENTS

| | | | | |
|---|---|---|---|---|
| 8,127,000 | B2* | 2/2012 | Wenig et al. | G06F 11/3476 709/224 |
| 8,868,533 | B2* | 10/2014 | Powell et al. | H04L 67/142 707/705 |

(Continued)

OTHER PUBLICATIONS

Du, Fan, Catherine Plaisant, Neil Spring, and Ben Shneiderman. "EventAction: Visual analytics for temporal event sequence recommendation." In 2016 IEEE Conference on Visual Analytics Science and Technology (VAST), pp. 61-70. IEEE, 2016. (Year: 2016).*

(Continued)

*Primary Examiner* — Anthony J Amoroso
(74) *Attorney, Agent, or Firm* — Fish & Richardson P.C.

(57) ABSTRACT

Methods, systems, and apparatus, including computer programs encoded on a computer storage medium, for evaluating the impact of events related to user interfaces on target outcomes. In one aspect, a method includes defining a set of sequential events including a target outcome and a series of lead-up events that are required to occur prior to the target outcome. The processor(s) identify matching sessions during which at least one of the lead-up events was performed based on session data for each matching session including data identifying the at least one lead-up event. The processor(s) examine session data for each of the matching sessions to determine how many of the matching sessions included a specified session feature. The impact of the specified session feature on the target outcome is determined based on an unrealized metric of the matching sessions that included the specified session feature, but did not include the target outcome.

20 Claims, 11 Drawing Sheets

(56) References Cited

U.S. PATENT DOCUMENTS

| | | | |
|---|---|---|---|
| 9,083,756 B2* | 7/2015 | Shen et al. | H04L 67/142 |
| 9,495,340 B2* | 11/2016 | Powell et al. | G06F 40/143 |
| 9,766,769 B1* | 9/2017 | Webber et al. | G06F 3/0481 |
| 10,102,306 B2* | 10/2018 | Le Bras et al. | G06F 16/2358 |
| 11,036,524 B1 | 6/2021 | Mastracci et al. | |
| 11,403,539 B2* | 8/2022 | Le Bras et al. | G06Q 30/02 |
| 2010/0229112 A1* | 9/2010 | Ergan et al. | G06F 11/0769 715/764 |
| 2013/0197675 A1* | 8/2013 | McCarthy et al. | G05B 13/021 700/28 |
| 2020/0005175 A1* | 1/2020 | Le Bras et al. | G06N 5/047 |

OTHER PUBLICATIONS

Lam, Heidi, Daniel Russell, Diane Tang, and Tamara Munzner. "Session viewer: Visual exploratory analysis of web session logs." In 2007 IEEE Symposium on Visual Analytics Science and Technology, pp. 147-154. IEEE, 2007. (Year: 2007).*

Shen, Zeqian, Jishang Wei, Neel Sundaresan, and Kwan-Liu Ma. "Visual analysis of massive web session data." In IEEE symposium on large data analysis and visualization (LDAV), pp. 65-72. IEEE, 2012. (Year: 2012).*

Wongsuphasawat, Krist, and Jimmy Lin. "Using visualizations to monitor changes and harvest insights from a global-scale logging infrastructure at twitter." In 2014 IEEE Conference on Visual Analytics Science and Technology (VAST), pp. 113-122. IEEE, 2014. (Year: 2014).*

Zdziebko, Tomasz, and Piotr Sulikowski. "Monitoring human website interactions for online stores." In New Contributions in Information Systems and Technologies, pp. 375-384. Springer, Cham, 2015. (Year: 2015).*

* cited by examiner

200

| Session No. | User ID | Event 1 | Event 2 | Event 3 | Event 4 | Event 5 | Event 6 | Event 7 | Event 8 | Event 9 | Event 10 | Cart Amount |
|---|---|---|---|---|---|---|---|---|---|---|---|---|
| 1 | 1221 | Load Page 36 | User Click Item 12 | Load Page 37 | User Click "Add to Cart" | Error 182 | Session Ends | | | | | $78 |
| 2 | 9482 | Load Page 90 | User Click Item 37 | Load Page 91 | User Click "Add to Cart" | Load Page 102 | User Click "Purchase" | Load Confirmation | User Click "Confirm" | Session Ends | | $239 |
| 3 | 123 | Load Page 21 | User Click Item 82 | Load Page 22 | User Click "Add to Cart" | Load Page 102 | User Click "Purchase" | Load Confirmation | User Click "Confirm" | Session Ends | | $671 |
| 4 | 243 | Load Page 43 | User Click Item 901 | Error 19 | Session Ends | | | | | | | $0 |
| 5 | 311 | Load Page 67 | User Click Item 56 | Load Page 68 | User Click "Add to Cart" | Load Page 102 | Error 19 | Session Ends | | | | $55 |
| 6 | 905 | Load Page 12 | Error 19 | Load Page 12 | User Click Item 21 | Load Page 13 | User Click "Add to Cart" | Load Page 102 | User Click "Purchase" | Load Confirmation | User Click "Confirm" | $413 |
| 7 | 381 | Load Page 60 | User Click Item 55 | Load Page 61 | Session Ends | | | | | | | $0 |
| 8 | 209 | Load Page 71 | Load Page 42 | Session Ends | | | | | | | | $0 |
| 9 | 209 | Load Page 81 | User Click Item 71 | Load Page 82 | Error 182 | Load Page 82 | User Click "Add to Cart" | Load Page 102 | User Click "Purchase" | Load Confirmation | User Click "Confirm" | $37 |

210

220

| Event | Conversion with Event | Conversion Without Event | Conversion Difference | Unrealized Purchases |
|---|---|---|---|---|
| Error 19 | 33% | 60% | 34% less likely to convert | $55 |
| Error 182 | 50% | 50% | Just as likely to convert | $78 |

FIG. 2

Impact List Interface — 900 https://www.example.com/ImpactList_Interface/Pub?=123456 — 901

Dimension Explorer — 902

🔍 Search All Segments and Properties

[ All ] | User Properties | Segments | Device | Browsers | Geography | Marketing — 910

| Segment | Conversion | Clicked Join / Login | Clicked Join Now | Clicked Join Submit | Changed Email Address | Clicked joinSubmit | Viewed Confirmation |
|---|---|---|---|---|---|---|---|
| ☐ Unaffected Users | 29.8% | 32,128 | 19,919 | 62% | 17,027 | 53% | 41% | 9,574 |
| ▨ Affected Users | 21.1% | 4910 | 2406 | 49% | 1964 | 40% | 34% | 1036 |

< 1-2 of 2 >

Screen Resolution Breakdown — 920
By Conversion Rate ▾

| Resolution | Conversion % | Users |
|---|---|---|
| 375x667 | 38.2 | 15k |
| 1448x900 | 29.8 | 1.9k |
| 1366x768 | 22.1 | 5.7k |
| 1280x1024 | 18.7 | 981 |

— 921

Errors — 930
By Conversion Rate ▾

| Error | Conversion % | Users |
|---|---|---|
| Error F | 24.1 | 1.2k |
| Error B | 21.5 | 879 |
| Error X | 18.5 | 1.9k |
| Error A | 13.2 | 981 |

— 931

Browser Breakdown — 940
By Conversion Rate ▾

| Browser | Conversion % | Users |
|---|---|---|
| Browser C | 35.8 | 3.9k |
| Browser A | 31.2 | 5.9k |
| Browser E | 29.7 | 6.7k |
| Browser D | 23.4 | 10.3k |

USER INTERFACE EVENT IMPACT ANALYSIS

BACKGROUND

This specification relates to data processing and evaluating the impact of events related to user interfaces.

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls).

Some user interfaces experience errors, such as errors that prevent content or user interface controls from loading, errors that delay the presentation of content or controls, and errors that do not enable functionality that should be enabled at the user interface. Such errors can prevent a user from completing a task or cause the user to discontinue a session with a resource or application.

SUMMARY

In general, one innovative aspect of the subject matter described in this specification can be embodied in methods that include defining, by the one or more processors, a set of sequential events including a target outcome and a series of lead-up events that are required to occur prior to the target outcome. The one or more processors identify, from an index of session data, matching sessions during which at least one of the lead-up events was performed based on the session data for each of the matching sessions including data identifying the at least one lead-up event. The one or more processors examine the session data for each of the matching sessions to determine how many of the matching sessions included a specified session feature. The one or more processors determine an impact of the specified session feature on the target outcome based on an unrealized metric of the matching sessions that included the specified session feature, but did not include the target outcome. The one or more processors generate an interactive user interface that includes a visualization of the impact of the specified session feature and a control that triggers presentation of one or more of the matching sessions that included the specified session feature, but did not include the target outcome. Other embodiments of this aspect include corresponding methods, apparatus, and computer programs, configured to perform the actions of the methods, encoded on computer storage devices.

These and other embodiments can each optionally include one or more of the following features. In some aspects, the specified session feature is an event that occurred during each of the matching sessions. The specified session feature can be a user interface error that prevented occurrence of the target outcome. The user interface error can be defined by a user input. Some aspects can include learning the user interface error from the index of session data.

In some aspects, the specified session feature includes a specified user dimension, the specified user dimension being at least one of (i) a characteristic of a user of a session or (ii) a characteristic of a user device for which the session occurred. Some aspects can include generating, for each type of error, a group that includes sessions in which an error of the type of error occurred and determining, for each type of error, an impact of the type of error on the target outcome based on an unrealized metric of the sessions in the group for the type of error that included at least one error of the type of error, but did not include the target outcome.

In some aspects, the interactive user interface includes a second control that triggers presentation of other session features related to the matching sessions. Some aspects can include detecting user interaction with the second control and, in response, identifying, in the matching sessions, other session feature included in the matching sessions. Each of the other session features can be different from the specified session feature. Some aspects can include updating the user interface to present one or more of the other session features.

In some aspects, the index of session data includes, for each session, data specifying at least one of hardware or software corresponding to a device at which the session occurred. Some aspects can include identifying, in matching sessions that include the specified session feature, hardware or software of the device on which the matching session occurred and generating a user interface that presents data specifying the hardware or software of the device on which the matching session occurred.

Some aspects can include determining, for one or more additional session features, an impact of the additional specified session feature on the target outcome based on an additional unrealized metric of matching sessions that included the additional specified session feature, but did not include the target outcome. Some aspects can include ranking the specified session feature and the one or more additional specified session features based on the impact of the specified session feature and the impact of each of the one or more additional specified session features, and generating a user interface that presents the ranking. Some aspects can include detecting a user selection of a given session feature in the ranking and generating a user interface that presents additional data for the selected session feature.

Particular embodiments of the subject matter described in this specification can be implemented so as to realize one or more of the following advantages. The impact of events or other measureable features related to user interfaces on the completion of target outcomes can be determined such that the applications or web pages that include the user interfaces and/or the user interfaces themselves can be improved to provide a better user experience. Evaluation of the impact of events that thwart the completion a target outcome, e.g., by quantifying the impact based on an unrealized metric, can reveal difficulties that users have with user interfaces and can also reveal which of these events provide the greatest impact on the target outcome. This enables user interface developers to focus on session features (e.g., events and other measurable features) that provide the greatest impact and to improve the user experience in a way that improves this impact. Determining the impact of multiple events of a same type also provide similar insights to the types of events that provide the greatest impact.

Characteristics of devices at which particular events, e.g., particular errors, occur or at which errors have the greatest impact can also be identified such that the user interface can be improved on devices having those characteristics. For example, if a particular error occurs more often on devices having a particular web browser, the user interface can be improved for that web browser. An interactive user interface can present the impact of various session features, e.g., in a ranking based on impact, so that a user interface developer can quickly identify the most impactful session features.

The interactive user interface can also enable users to drill down to view additional details about the session features and to view the playback of user sessions that included the session features. These user interfaces, including the playbacks of the sessions, provide valuable insights into how events occur and their impact on target outcomes, which enable the user interface developers to improve the user experience and improve the impact on the target outcome.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is an example data flow for determining the impact of a specified event on a target outcome.

FIG. 9 is an illustration of an example user interface for presenting additional data related to the effects of an event on a set of sequential events.

FIG. 11 is an illustration of an example user interface for presenting additional related to the effects of user dimensions on a set of sequential events.

DETAILED DESCRIPTION

Figure 1:
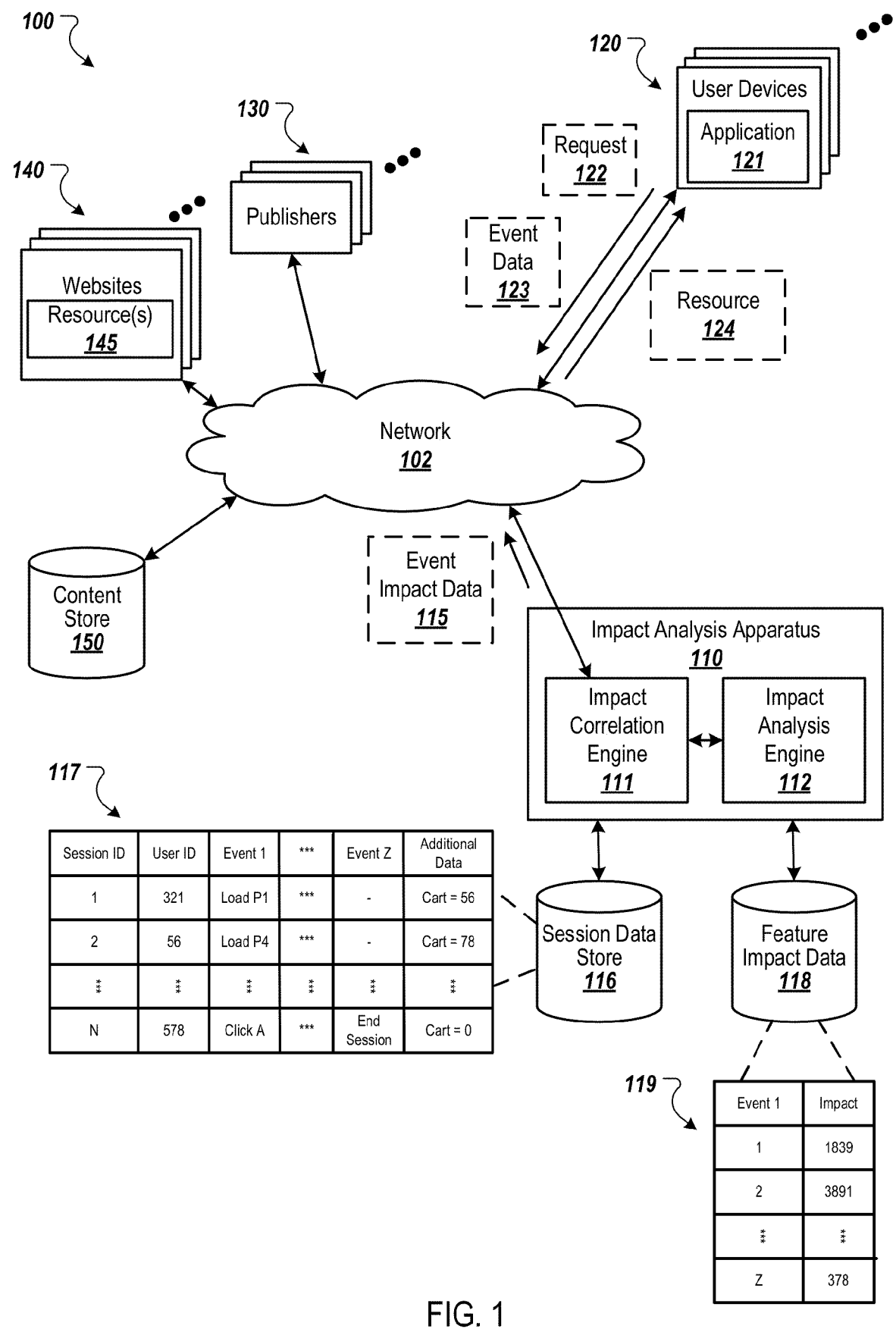
FIG. 1 is a block diagram of an example environment in which users interact with user interfaces and the impact of events are evaluated.

Like reference numbers and designations in the various drawings indicate like elements.

Publishers (e.g., an entity that provides a user interface) generally want to make user interfaces user friendly so that users will have a positive experience. Having information about user interactions with a given user interface (e.g., a web page or an application interface) and events that occur during user sessions with user interfaces can help a publisher identify aspects of the user interfaces that can be changed to improve the user experience. This document discusses techniques for identifying events that thwart users from reaching a target outcome and other measurable features related to sessions that do not reach the target outcome, and determining an impact of the events and other features based on an unrealized metric, e.g., unrealized conversions or unrealized purchase amounts resulting from the users not reaching the target outcome. By providing publishers with data identifying session features (e.g., events and/or other measurable features) that provide the greatest impact, the publishers can modify their user interfaces to reduce (or increase) the occurrence of such events and/or to improve the performance of the user interface in sessions that include the features (e.g., sessions in which the user interface was presented in a particular web browser) in a way that increases the number of users that reach the target outcome.

For example, a target outcome may be completing a purchase using a web interface provided by a publisher. To purchase an item, a user may have to complete a series of lead-up events, such as selecting the item, selecting a user interface control for adding the item to a virtual shopping cart, selecting a user interface control to purchase the item(s) that are in the virtual shopping cart, entering payment information, and confirming the purchase. To determine the impact of session features on users completing purchases, matching sessions that included at least one of the lead-up events can be identified. For example, a matching session can include a session in which a user selected a product and added the product to the virtual shopping cart, but then exited the web interface without purchasing the product. The sessions that include a lead-up event indicates that it is a session in which a user entered workflow for making a purchase, irrespective of whether the user completed a purchase.

For a specified session feature, e.g., a particular error that occurred during at least one of the matching sessions or a particular web browser that presented the user interface for at least one of the matching sessions, a quantity of the sessions that included the specified session feature can be determined. If the specified session feature is the particular error, the impact of the particular error can then be determined based on the matching sessions that included the particular error, but did not include the purchase of an item. For example, the impact of the particular error may be based on the unrealized purchases that would have been realized if the error did not occur. To determine this impact, the purchase amount for each matching session that included the particular error, but did not include a purchase can be aggregated, e.g., added together. For example, the aggregate purchase amount that was not realized may be equal to the sum of the purchase amounts of the items in the virtual shopping carts for these sessions. By measuring the impact of events in this manner, a publisher can better quantify the impact of the events that thwart users from reaching target outcomes after performing at least one of the lead-up events for the target outcome.

FIG. 1 is a block diagram of an example environment 100 in which users interact with user interfaces and the impact of events are evaluated. The example environment 100 includes a network 102, such as a local area network (LAN), a wide area network (WAN), the Internet, or a combination thereof. The network 102 connects user devices 120, publishers 130, websites 140, and an impact analysis apparatus 110. The example environment 100 may include many different user devices 120, publishers 130, and websites 140.

A website 140 is one or more resources 145 associated with a domain name and hosted by one or more servers. An example website is a collection of web pages formatted in hypertext markup language (HTML) that can contain text, images, multimedia content, and programming elements, such as scripts. Each website 140 is maintained by a publisher 130, which is an entity that controls, manages and/or owns the website 140.

A resource 145 is any data that can be provided over the network 102. A resource 145 is identified by a resource address that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 120 is an electronic device that is capable of requesting and receiving resources over the network 102. Example user devices 120 include personal computers, mobile communication devices, and other devices that can send and receive data over the network 102. A user device 120 typically includes a user application 121, such as a web browser, to facilitate the sending and receiving of data over the network 102. The user device 120 can also include other user applications 121, such as native applications developed for a particular platform or a particular device. Publishers 130 can develop and provide the native applications to the user devices 120.

A user device 120 can submit a resource request 122 that requests a resource 145 from a website 140. In turn, data representing the requested resource 124 can be provided to the user device 120 for presentation by the user device 120. The requested resource 145 can be, for example, a home page of a website 140, a web page from a social network, or another resource 145. The data representing the requested resource 124 can include data that cause presentation of content (e.g., embedded content such as text that is included in the code of the resource) at the user device 120. The data representing the requested resource 124 can also include instructions that cause the user device 120 to request remote content from a content store 150. The remote content can include, for example, images, content that is updated periodically, content used across multiple different resources, or content provided by third parties (e.g., other than the publisher). Thus, the remote content can be updated or changed without having to update the resource code.

The environment 100 includes an impact analysis apparatus 150 that collects event data 123 from the user devices 120 and evaluates the effects of session features (e.g., events and other measureable features) on target outcomes. As used throughout this document, the phrase event data 123 refers to data obtained from a user device 120 during a user session. The event data 123 for a user session can include data indicating a sequence of events that occurred during the user session.

An event is something that occurs during a user session with a user interface. The event data 123 for a user session can include data identifying a sequence of interfaces, e.g., a sequence of resources presented by a web site, viewed during the user session and an amount of time that each interface was presented to the user. The event data 123 can include timestamp information and/or sequential numbering information specifying when each event occurred so that the event data 123 can be coordinated with other data.

The event data 123 can also include user interaction data that specifies user interactions with elements of the user interface. The user interaction data can specify mouse movements, user clicks, mouse hovers, highlights, text inputs, and any other user interactions that are performed at the user device 120. For example, assume that a user clicks on an item in a list. In this example, the user interaction data will specify that a user click occurred and identify the element of the user interface that was clicked. Other example user interactions that can be specified by the event data 123 include using a search function, selecting a particular button or interface control, viewing help or frequently asked question pages, spending at least a threshold amount of time on a given screen, etc.

Another type of event that can be specified by the event data 123 is an error encountered during the user session. The events can include user interface errors, e.g., errors that prevent content or user interface controls from loading, errors that delay the presentation of content or controls (e.g., errors that cause content to not be presented within a threshold amount of time after being requested), and errors that do not enable functionality that should be enabled at the user interface. The events can also include network errors, e.g., loss or connectivity by the user device 120, device errors, e.g., memory stack errors, and/or other appropriate types of errors. The event data 123 can specify, for each error, an identifier for the error (e.g., a name, type, or unique identifier code for the error) and/or details about the user interface at the time the error occurred. For example, the event data 123 can specify the URL of a resource that was presented when the error occurred.

Data related to errors, e.g., the identifier for the errors, can be obtained by the application 121 during the user session. For example, the application 121 (or resource being presented in a browser application) can include code that detects when an error occurs and obtains the data in response to the detection. In a particular example, if an error causes a pop-up window to be presented, the identifier code for the error can be obtained from the pop-up window. In another example, the code can detect errors based on error messages generated by the user device 120 and obtain the data from the messages.

Another example type of event is a detectable user frustration event, e.g., moving a mouse rapidly back and forth, rapid mouse clicks, and/or other signals of user frustration. These events can be detected by the user device 120 or the impact analysis apparatus 110 based on data related to input data, e.g., mouse input data that specifies the movement of a mouse or other pointer during the user session.

The event data 123 can also include timestamp information and/or sequential numbering information specifying when each event occurred so that the event data 123 can be coordinated with other data. For example, the timestamp or sequential numbering information can be used to determine which interface or content was presented and/or what error occurred when a user frustration event occurred.

The event data 123 can also include context data related to the user session. This context data can include the type of user device 120 at which the user session occurred, the type of web browser in which the user interface was presented, hardware and/or software of the user device 120 (e.g., operating system, processor type, mobile device model, etc.), the geographic location of the user device 120 at the time of the session, and/or other appropriate context data.

The event data 123 can also include additional data related to the user session. For example, data can be extracted from a Document Object Model (DOM) of a resource during the user session. This data can include, for example, information about items that a user added to a virtual shopping cart during the user session. This data can be obtained periodically or each time the data changes so that, if an error occurs or the session ends, the data can be sent to the impact analysis apparatus 110. In another example, this data can be sent, along with the event data 123, to the impact analysis apparatus 110 periodically or each time the data changes.

The event data 123 can also include data that can be used to playback the user session. Example techniques for obtaining event data that can be used to playback user sessions are described in U.S. Pat. No. 9,766,769, filed on Dec. 31, 2014, entitled, "Evaluation of Interactions with a User Interface," and U.S. Pat. Application No. 16/038,002, filed on Jul. 17, 2018, entitled "Capturing and Processing Interactions with a User Interface of a Native Application," which are herein incorporated by reference.

As used throughout this document, a user session is a period of user interaction with a user interface, e.g., of a website or native application. In the context of a website, the user session can begin when a user requests a first resource from a given domain (e.g., example.com) and can end when a session end condition is met. In the context of a native application, the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 120 for some time (e.g., until the user reopens the browser or again launches the native application) prior to the user device 120 submitting the session end message to the impact analysis apparatus 110.

The impact analysis apparatus 110 receives the event data 123 from the user device 120 and stores the event data 123 in a session data store 116. For example, the impact analysis apparatus 110 can store the event data 123 in an index of session data 117 that is stored in the session data store 116. The index of session data 117 can include, for each user session, the event data 123 received for that user session and optionally additional data, such as context data relating to user device 120 (e.g., hardware and/or software of the device, the geographic location of the device, etc.).

In general, the impact analysis apparatus 110 can evaluate the session data 117 to determine the impact of session features (e.g., an event of other measureable feature) on a target outcome. A target outcome can be an event that follows a series of lead-up events, e.g., the event at the end of a funnel or workflow that is of interest to a publisher 130 or that creates something of value to the publisher. For example, user interfaces can provide a workflow for a user to perform a task, such as purchase a product, book travel arrangements, or create a gift registry. To complete such a task, the user may be required to complete subtasks as part of the workflow, such as find a product or flight, select a product or flight, initiate the purchase of the product or flight, and confirm the purchase of the product or flight. In this example, the target outcome would be the user confirming the purchase of the product or flight and each other sub-task would be a required lead-up event.

Some events can thwart the user from reaching the target outcome. For example, an error that prevents a resource for initiating the purchase from loading may cause the user to end the session without completing the purchase. Some events can also make it more likely that a user reaches the target outcome. For example, users that view a particular resource, e.g., a help page for a gift registry, may be more likely to complete a gift registry. The impact analysis apparatus 110 can evaluate the session data 117 to determine the impact, e.g., positive and/or negative, that various events have on target outcomes.

The impact analysis apparatus 110 can determine the impact of various types of events that occur during a user session on the target outcome. For example, the impact analysis apparatus 110 can determine the impact that each error has on a target outcome. The impact analysis apparatus 110 can also determine the impact of non-error events described above, such as viewing a particular resource, viewing the particular resource for at least a threshold duration of time, performing a particular user frustration event, or another appropriate type of event.

The impact analysis apparatus 110 can also determine the impact of other measurable features that describe user experiences during user sessions with a user interface. These measurable features include a type of browser presenting the user interface, the type of device presenting the user interface, the referrer to the user interface, the geographic location of the device presenting the user interface, a Urchin Tracking Module (UTM) code of a Universal Resource Locator (URL) of the resource, membership of the user in a user defined segment (e.g., in a test group, returning customer group, etc.), and/or other appropriate measurable features. This data can be included in event data 123 for a user session. Although the examples that follow are described largely in terms of events, similar techniques can be used to determine the impact of these other measurable features.

The impact analysis apparatus 110 includes an impact correlation engine 111 and an impact analysis engine 112. The impact correlation engine 111 can correlate the event data 123 for one or more session features for which the impact on a target outcome will be evaluated. The session features can include events and/or other measurable features, as described above. In some implementations, the impact correlation engine 111 receives data defining a set of sequential events that include a target outcome and a series of lead-up events that are required to occur prior to the target outcome. The series of lead-up events and the target outcome can be part of a user interface workflow or funnel, as described above. The set of sequential events can be defined by a user, e.g., a publisher 130 for which the impact is being analyzed.

The impact correlation engine 111 can identify, in the session data 117, matching sessions during which at least one of the lead-up events occurred. These matching sessions represent user sessions in which a user entered the workflow or funnel represented by the set of sequential events. The matching sessions can include user sessions that include the target outcome (i.e., sessions in which the target outcome occurred) and user sessions that do not include the target outcome (i.e., sessions in which the target outcome did not occur).

In these matching sessions, the impact correlation engine 111 can identify, for each of one or more specified session features, the matching sessions that include the specified session feature. The specified session feature can be an error or other event for which the impact analysis engine 112 will determine its impact. For example, the impact correlation engine 111 can identify the matching sessions that include a particular error. In another example, the specified session feature can be a geographic location of user device at which the user interface was presented. In this example, the impact correlation engine 111 can identify the matching sessions that occurred on user devices located in the geographic location. For each specified session feature, the impact correlation engine 111 can identify the session data for the matching sessions that include the specified session feature and provide the data to the impact analysis engine 112 for analysis.

The errors for which the impact is determined can be based on user input, e.g., user-defined errors. In some implementations, the impact correlation engine 111 can learn errors. For example, the impact correlation engine 111 can analyze the session data to learn errors that occur in the sessions. In a particular example, the impact correlation engine 111 can identify, as errors for analysis, errors that occur in sessions that did not include the target outcome, errors that occur in at least a threshold number of the sessions, and/or errors that occur at or near the end of the sessions (e.g., within a threshold number of events or seconds before the session ends).

In some implementations, the impact analysis apparatus 110 evaluates the impact of types of errors, e.g., in addition to, or rather than, individual events. In this example, the impact correlation engine 111 can assign each error to an error type. The impact correlation engine 111 can identify the matching sessions that include at least one error of the error type. The impact correlation engine 111 can provide the session data for the matching sessions that include at least one event of the error type and provide the data to the impact analysis engine 112 for analysis.

The impact analysis apparatus 110 can also evaluate the impact of events based on the number of times the events occur in a user session. For example, encountering a particular error or particular type of error once may have a different impact than encountering the particular error or particular type of error five times. In this example, the impact correlation engine 111 (or a user) can define buckets for each event count or for ranges of event counts (e.g., 1-2 occurrences, 3-5 occurrences, and 6 \+ occurrences). The impact correlation engine 111 can identify, for each bucket, the matching sessions that include the number of occurrences of the particular event or particular type of event. The impact correlation engine 111 can provide the session data for each bucket to the impact analysis engine 112 can evaluate the impact of the number of occurrences of the particular event or particular type of event so that the impact of each number of occurrence can be compared.

Some events (or other measurable features) have continuous ranges rather than counts. For example, load times for loading a resource can be along a continuous range. For events or measurable with continuous ranges, the buckets can be based on ranges of values. In the load time example, the buckets can be, for example, 0-50 milliseconds (ms), 51-150 ms, 151-350 ms, and >350 ms, or other appropriate time ranges.

The impact analysis engine 112 can determine the impact of a specified session feature (e.g., event or other specified measurable feature) on a target outcome based on the data received from the impact correlation engine 111. The impact analysis engine 112 can determine the impact of a specified session feature based on an unrealized metric that would have been realized if the target outcome occurred. The impact of the specified session feature can be determined by aggregating the unrealized metric across the matching sessions that include the specified session feature, but that do not include the target outcome.

For example, if the target outcome was the purchase of a product, but an error thwarted the user from competing the purchase, the amount of the purchase would be the unrealized metric. In this example, the impact analysis engine 112 can aggregate (e.g., determine the sum of) the unrealized purchase amounts for each matching session that included the error, but did not include the target outcome. This aggregate value is the unrealized purchases caused by the error, which in turn represents the impact of the error. A similar aggregation can be performed for other specified session features. For example, if the specified session feature is a particular web browser, the impact analysis engine 112 can aggregate (e.g., determine the sum of) the unrealized purchase amounts for each matching session for which the user interface was presented using the particular web browser.

The actual purchase amounts can be determined based on the amounts for the items in a virtual shopping cart when the user session ended. If this amount is not known, the impact analysis engine 112 can use a proxy for the amount, e.g., the average purchase amount for products purchased using the user interface, the average purchase amount for products purchased by users using the user interface and that are located in a same geographical area as the user, and/or other estimated purchase amounts.

The impact of a specified event or other measureable feature can be determined based on other metrics. For example, the impact for user interfaces related to purchasing a product or service using a user interface can be based on conversion percentages (e.g., the percentage of user sessions in which at least one lead-up event occurs that also includes the target outcome), virtual shopping cart abandonment rate, active time in an application or on a website, total orders, new versus returning customer orders, and/or average number of return visits. For other services, the impact can be based on a conversion percentage of users that paid for a service after a trial period, average subscription value, average upgrade value, churn percentage, active time in an application or on a website, N-Day actives, and/or number of teammates invited.

In some implementations, the impact analysis engine 112 can generate cohorts for each specified session feature (e.g., event or other measureable feature) for which the impact is analyzed. A cohort is a group of user sessions having one more common events and/or other common features. For example, the impact analysis engine 112 can generate, for a specified event, a first cohort that includes all matching sessions that have the specified session feature and a second cohort for matching sessions that have the specified session feature and the target outcome. The impact analysis engine 112 can then aggregate a value for each cohort. For example, if the impact that is to be evaluated is a conversion percentage (e.g., the percentage of users that reach the target outcome), the impact analysis engine 112 can determine a first number of matching sessions included in the first cohort and a second number of matching sessions included in the second cohort. To determine the conversion percentage, the impact analysis engine 112 can divide the second number (number of converted sessions) by the first number (total number of sessions) and multiply the quotient by 100. If the specified event is a particular error, this provides the conversion percentage for users that encountered the particular error, but still made it to the target outcome. This conversion percentage can be compared to an overall conversion percentage for the matching sessions that included at least one of the lead-up events for the set of sequential events.

For scalar valued inputs, e.g., specified events that occurred 0, 1, 2, 3, or 4+ number of times or users that used a search function 0, 1, 2, 3, or 4+ number of times, the impact analysis engine 112 can first generate buckets for the inputs and then generate the cohorts. Using the search function as an example, the impact analysis engine 112 can generate a bucket for 0 uses of the search function, a bucket for 1 use of the search function, a bucket for 2 uses of the search function, a bucket for 3 uses of the search function, and a bucket for 4 uses of the search function. For each bucket, the impact analysis engine 112 can generate the two cohorts, a first cohort for all matching user sessions in the bucket and a second cohort for matching user sessions in the bucket that includes the target outcome. The impact analysis engine 112 can then aggregate a value for each cohort of each bucket.

In this way, a conversion percentage (or other metric) can be determined for each bucket (e.g., by dividing the second number for the bucket by the first number for the bucket and multiplying the quotient by 100) and the conversion percentages for the buckets can be compared. For example, the publisher 130 can view the conversion percentages and realize that users that use the search function a particular number of times has a much higher conversion percentage than users that use the search function a different number of times.

The impact analysis engine 112 can store data specifying the impact of each specified session feature in feature impact data store 118. The feature impact data store 118 can include an impact index 119 that includes, for each specified session feature (e.g., event or other measureable feature), the impact that the specified session feature on the target outcome.

The impact analysis apparatus 110 can also generate and provide, for the user device 120, interactive user interfaces that present data related to session feature and the impact of the session feature. For example, the impact analysis apparatus 110 can generate a user interface that includes a visualization of the impact of a specified session feature on a target outcome. The interactive user interface can include controls that enable a user to view additional information related to the specified session feature. For example, the interactive user interface can include a control that triggers presentation of one or more of the matching sessions that included the specified session feature, but did not include the target outcome. The presentation can be a playback of the matching session so that the user can view what happened during the session and determine how the user interface can be improved to improve the user experience and to improve the metric on which the impact is based. Some example user interfaces are illustrated in FIGS. 4-11 and described below.

In some implementations, the impact analysis apparatus 110 also analyzes the difference between active users of an application or website and users that have only used the application or website a few times (e.g., less than a threshold number of times). This can provide insight into why some users continue to use the application or website and why others do not.

The impact analysis apparatus 110 can split the users into two cohorts, i.e., a first cohort that includes users that used the application or website up to a threshold number "N" of sessions and a second cohort of users that used the application or website greater than N sessions. In some implementations, a threshold amount time using the application or website, or a threshold amount of time logged into the website or application can be used to define the two cohorts. The impact analysis apparatus 110 can then compare input features of the first N sessions of the two cohorts to determine similarities and differences between these sessions. For example, the impact analysis apparatus 110 may determine that the first N user sessions for the second cohort of active users included a greater amount of time spent watching a tutorial than the first N sessions of the first cohort of non-active users. In another example, the impact analysis apparatus 110 may determine that the average page load times for the first N user sessions for the second cohort of active users was significantly less than the average page load times for the first N user sessions of the first cohort of non-active users.

In some implementations, the impact analysis apparatus 110 may filter out the user sessions for the first cohort of non-active users when performing the impact analysis described above. For example, the impact analysis apparatus 110 may remove, from the matching sessions that include at least one lead-up event for a series of set of sequential events, those user sessions for which the user has used the user interface (e.g., of an application or website) for fewer than a threshold number of sessions (e.g., fewer than four sessions).

FIG. 2 is an example data flow 200 for determining the impact of a specified session feature on a target outcome. In this example, an index of session data 210 for user sessions with a user interface that enables users to purchase products via a user interface is analyzed. The index of session data 210 can be analyzed by the impact analysis apparatus 110 of FIG. 1. The impact analysis apparatus 110 can analyze the index of session data 210 to the determine the impact of session feature of sessions indexed in the index of session data 210. In this example, the impact analysis apparatus 110 analyzes errors that occurred in the sessions. The impact analysis apparatus 110 can perform similar analyses for other session features, e.g., for each type of web browser used for the sessions, each geographic location at which a session occurred, etc.

The index of session data 210 includes event data for nine user sessions. For each user session, the index of session data 210 includes a user identifier for a user of the user session, a series of events that occurred during the user session, and a cart amount. The cart amount can be an amount (e.g., total cost) for one or more items that were put in a virtual shopping cart during the session. For user sessions in which the items were purchased, the amount can be the final purchase amount. For user sessions that ended prior to purchase, the amount can be the amount of the items in the virtual shopping cart when the session ended. As described above, the amounts can be obtained from a DOM of the resource that includes the user interface.

The impact analysis apparatus 110 can analyze the sessions to determine the impact of errors on a target outcome. In this example, the target outcome is for a user to confirm the purchase of one or more items from a virtual shopping cart. This target outcome can be part of a set of sequential events that include the lead-up events of a user selecting an item (e.g., to view a product page for the item), a user clicking an "Add to Cart" user interface control to add an item to the virtual shopping cart and a user click of a "Purchase" user interface control to initiate the purchase of the item(s) in the virtual shopping cart.

The impact analysis apparatus 110 can identify, as matching sessions, each session in the index of session data 210, the sessions that include at least one or the lead-up events. In this example, each session except the eighth session includes at least one of the lead-up events. Thus, the impact analysis apparatus 110 can identify, as the matching sessions, sessions 1-7 and 9.

The impact analysis apparatus 110 can then identify the matching sessions that include a specified event. In this example, the sessions include two errors, error 19 and error 182. Thus, the specified event can be error 19 or error 182. The impact analysis apparatus 110 can determine the impact of each error separately. As described above, the specified event can be defined by user input or learned based on the session data included in the index of session data 210. For example, a user may provide, as input to the impact analysis apparatus 110, data specifying error 19 for analysis. In another example, the impact analysis apparatus 110 can learn that errors 19 and 182 should be analyzed based on the errors being included in the sessions or being included in sessions that ended without the target outcome occurring.

The impact analysis apparatus 110 can determine the impact of each error in two different ways based on two different metrics. The impact analysis apparatus 110 can determine the conversion percentage for sessions that include the error and an unrealized purchase amount for the sessions that include the error.

As described above, the conversion percentage for an error can be determined by generating two cohorts using the sessions that include the error. The index of session data 210 includes three sessions in which error 19 occurred, sessions 4, 5, and 6. Sessions 4 and 5 do not include the target outcome (User Click "Purchase"), but Session 6 does include the target outcome. In this example, sessions 4, 5, and 6 are assigned to a first cohort for all sessions and session 6 is assigned to a second cohort for sessions that include the target outcome. The conversion percentage for sessions that include error 19 is the number of sessions in the second cohort (1) divided by the number of sessions in the first cohort (3) multiplied by 100. Thus, the conversion percentage for error 19 is 33%.

The index of session data 210 includes two sessions in which error 182 occurred, session 1 and session 9. Session 1 does not include the target outcome (User Click "Purchase"), but Session 9 does include the target outcome. In this example, sessions 1 and 9 are assigned to a first cohort for all sessions and session 9 is assigned to a second cohort for sessions that include the target outcome. The conversion percentage for sessions that include error 182 is the number of sessions in the second cohort (1) divided by the number of sessions in the first cohort (2) multiplied by 100. Thus, the conversion percentage for error 182 is 50%.

The impact analysis apparatus 110 can compare the conversion percentages for each error with the conversion percentages for matching sessions that did not include the error. In this example, the conversion rate is 50% for the other matching sessions that do not include error 182 as half of the six matching sessions that do not include error 182 do include the target outcome. Similarly, the conversion percentage for the other matching sessions that do not include error 19 is 60% as three of the five matching sessions that do not include error 19 include the target outcome. The impact analysis apparatus 110 can also determine a conversion difference for each error. For example, the impact analysis apparatus 110 can determine how much more (or less) likely a user is to reach the target outcome based on the conversion percentages. To do so, the impact analysis apparatus 110 can subtract the conversion percentage for the error from the conversion percentage for the matching sessions that do not include the error and divide the difference by the overall conversion percentage. In this example, the conversion difference for error 19 is 27% $\left(\frac{60-33}{50} *100\right)$, which indicate that users that encounter error 19 are less likely to convert than other users. Similarly, the conversion difference for error 182 is zero, indicating that users that encounter error 182 are no more likely and no less likely to convert than other users.

The impact analysis apparatus 110 can also determine the unrealized purchase amount for each error by identifying the cart amount for each session that included the error, but did not include the target outcome and aggregating the identified cart amounts. For error 19, the impact analysis apparatus 110 identifies the cart amount for session 4, i.e., $0, and the cart amount for session 5, i.e., $55. The impact analysis apparatus 110 can aggregate the two amounts, e.g., by determining a sum of the amounts, to determine the unrealized purchase amount. In this example, the unrealized purchase amount is 0+55 = $55.

Similarly, for error 182, the impact analysis apparatus 110 can identify the cart amount for session 1, i.e., $78. As this is the only session that includes error 182, but not the target outcome, the unrealized purchase amount for error 182 is $78.

Figure 3:
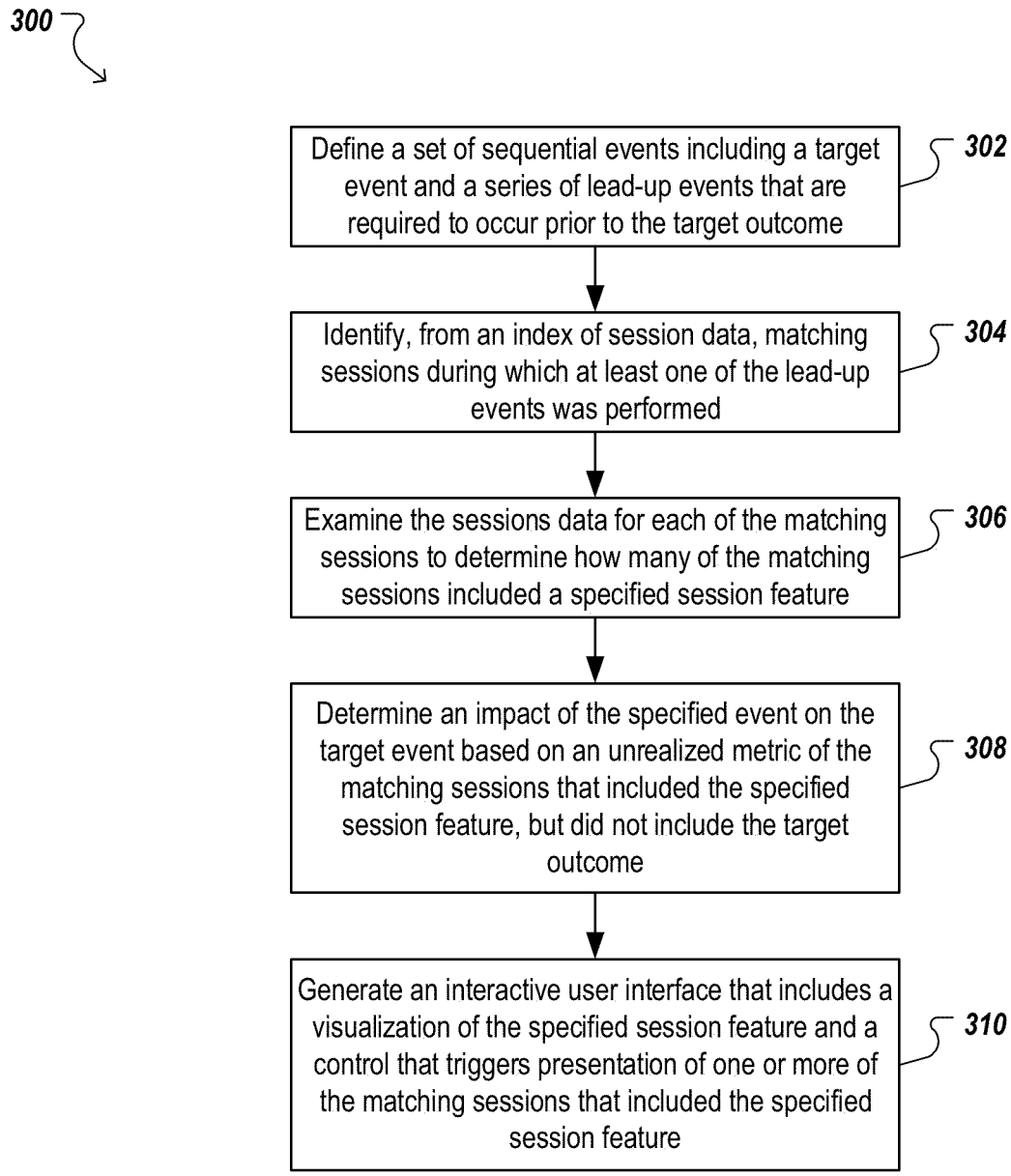
FIG. 3 is a flow chart of an example process for determining the impact of a specified event on a target outcome and generating an interactive user interface that includes a visualization of the impact.

FIG. 3 is a flow chart of an example process 300 for determining the impact of a specified session feature on a target outcome and generating an interactive user interface that includes a visualization of the impact. Operations of the process can be performed, for example, by one or more data processing apparatus, such as the impact analysis apparatus 110. Operations of the process 300 can also be implemented as instructions stored on a non-transitory computer readable medium. Execution of the instructions cause one or more data processing apparatus to perform operations of the process 300.

A set of sequential events is defined (302). The set of sequential events can include a target outcome (e.g., a target event) and a series of lead-up events that are required to occur prior to the target outcome. For example, the target outcome can be the booking of a flight using a user interface. In order to book the flight, a user may be required to complete other events, e.g., search for a flight, select a departure flight, select a return flight, select a purchase control, and confirm the purchase. In this example, the target outcome is confirming the purchase and the other events are lead-up events that are required to book the flight.

Matching sessions are identified (304). The matching sessions can be identified from an index of session data. The index can include session data for multiple user sessions in which multiple users interacted with a user interface. Continuing the flight example, the index of user sessions can include session data for users that used a user interface for booking flights. The session data for a user session can include a sequence of events that occurred during the session and other event data, such as context data, as described above.

Each matching session can be a user session during which at least one of the lead-up events was performed. In the flight example, the matching sessions would include any session that included a search for a flight, a selection of a departure flight, or a selection of a return flight.

The sessions data for each of the matching sessions is examined to determine how many of the matching sessions included a specified session feature (306). The specified session feature can be an event of interest to a user, e.g., a publisher of a resource that includes the user interface. The specified session feature can be another measurable feature related to the session, such as the web browser used for the session, the user device on which the web browser operated, the geographic location of the user device, etc. For example, the specified event can be a particular error that has occurred during at least one of the user sessions with the user interface. As described above, the error can be user defined or learned from the session data. A count of the number of matching sessions (i.e., sessions that include at least one of the lead-up events) that also includes the specified event (e.g., error) is determined.

An impact of the specified session feature on the target outcome is determined based on an unrealized metric of the matching sessions that included the specified session feature, but did not include the target outcome (308). Continuing the flight example in which the target outcome is booking a flight, the unrealized metric can be the total number of flights that were not booked in matching sessions that include the specified session feature, e.g., based on a count of the number of sessions that included the specified session feature but did not result in a flight being booked. The unrealized metric can also be the total amount for the flights that were not booked. For example, the impact analysis apparatus 110 can identify the amount for the flight(s) in each matching session that included the specified session feature, but that did not include the target outcome. The impact analysis apparatus 110 can then aggregate these amounts, e.g., by summing the amounts, to determine the total amount for the flights that were not booked.

For example, a user may select flights for a trip. However, the user may experience an error with the user interface that does not allow the user to complete the purchase. The user may then exit the session without booking the flight(s). The unrealized amount for this session may be the total amount for the selected flight(s) when the user exited the session. In another example, the session may end after the user searches for a flight, but before a flight is selected. In this example, the amount for the flight may be the average amount for the flights that match the search.

An interactive user interface is generated (310). The user interface can include a visualization of the specified session feature and a control that triggers presentation of one or more of the matching sessions that included the specified session feature. The visualization of the specified session feature can include a visualization, e.g., a chart, that indicates the impact of the specified session feature on the target outcome. For example, the visualization can show the unrealized metric that is correlated with, or caused by, the specified session feature.

In another example, the visualization can include a ranking of session feature based on the amount of the impact for the session feature. For example, multiple session feature can be analyzed using the operations 302-308. The session feature can then be ranked based on the determined unrealized metrics for the analyzed session feature. In this way, a user can quickly determine which session feature cause the most impact and improve the user interface based on the session feature that cause the most impact. For example, if a particular error results in the greatest amount of unrealized flight bookings, the user can focus on preventing the error from occurring in the future.

Figure 4:
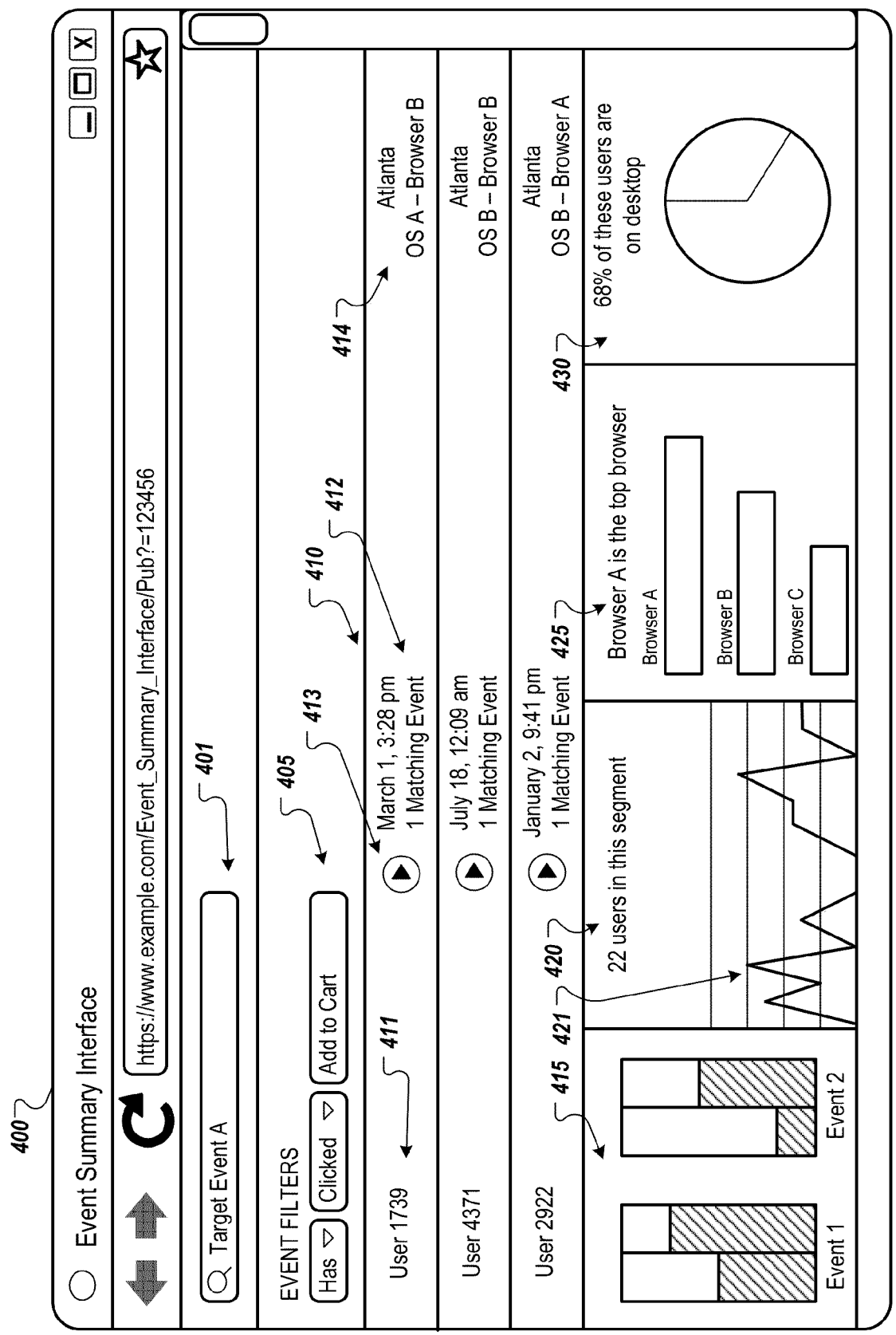
FIG. 4 is an illustration of an example user interface for presenting data related to events.

FIG. 4 is an illustration of an example interactive user interface 400 for presenting data related to events. The user interface 400 includes a search element 401 that enables a user to search for user sessions that include an event or other data. In this example, a user has searched for user sessions that include target outcome A. Although FIG. 4 illustrates a user interface 400 for presenting data related to events, a similar user interface can be used to present data related to other measurable features, e.g., web browsers used for the sessions, instead of, or in addition to, the data related to the events.

The user interface 400 also includes event filters 405 that enable a user to filter the user sessions based on filtering criteria. The filtering criteria can be based on events that occurred in the user sessions. In this example, the filtering criteria filters the user sessions to only present those that include an event in which a user clicked an "Add to Cart" user interface control.

The user interface 400 also includes session elements 410 for user sessions that match the query and that satisfy the filtering criteria. Each session element 410 includes the user identifier 411 for the user of the user session. Each session element 410 also includes a playback user interface element 412 that includes a playback control 413, the date and time that the user session occurred, and the number of matching events in the user session. User selection of the playback control 413 for a user session triggers the playback of the user session.

The user interface 400 also includes an interactive event impact visualization 415 that presents the impact of events on target outcome A. The visualization 415 can be presented in the user interface 400 in response to a user searching for a target outcome for which the impact of events has been determined. In this example, the visualization 415 includes a graph of the impact of two events on target outcome A. The impact can be based on conversion rates for the events or another appropriate metric. User interaction with the visualization 415 can trigger presentation of a user interface that includes additional details related to the impact of the events on target outcome A. An example of such a user interface is illustrated in FIG. 5 and described below.

The user interface 400 also includes a visualization 420 of the number of users in the segment that match the query and that satisfies the filtering criteria. The visualization 420 includes a graph 421 that represents the changes in the number of users over time.

The user interface 400 also includes a visualization 425 that shows, for each type of web browser, the number of the user sessions that match the query and that satisfy the filtering criteria, and that were completed using the web browser. Similarly, the user interface 400 includes a visualization 430 that shows, for each type of device (e.g., desktop or mobile), the number of the user sessions that match the query and that satisfy the filtering criteria, and that were completed on the type of device.

Figure 5:
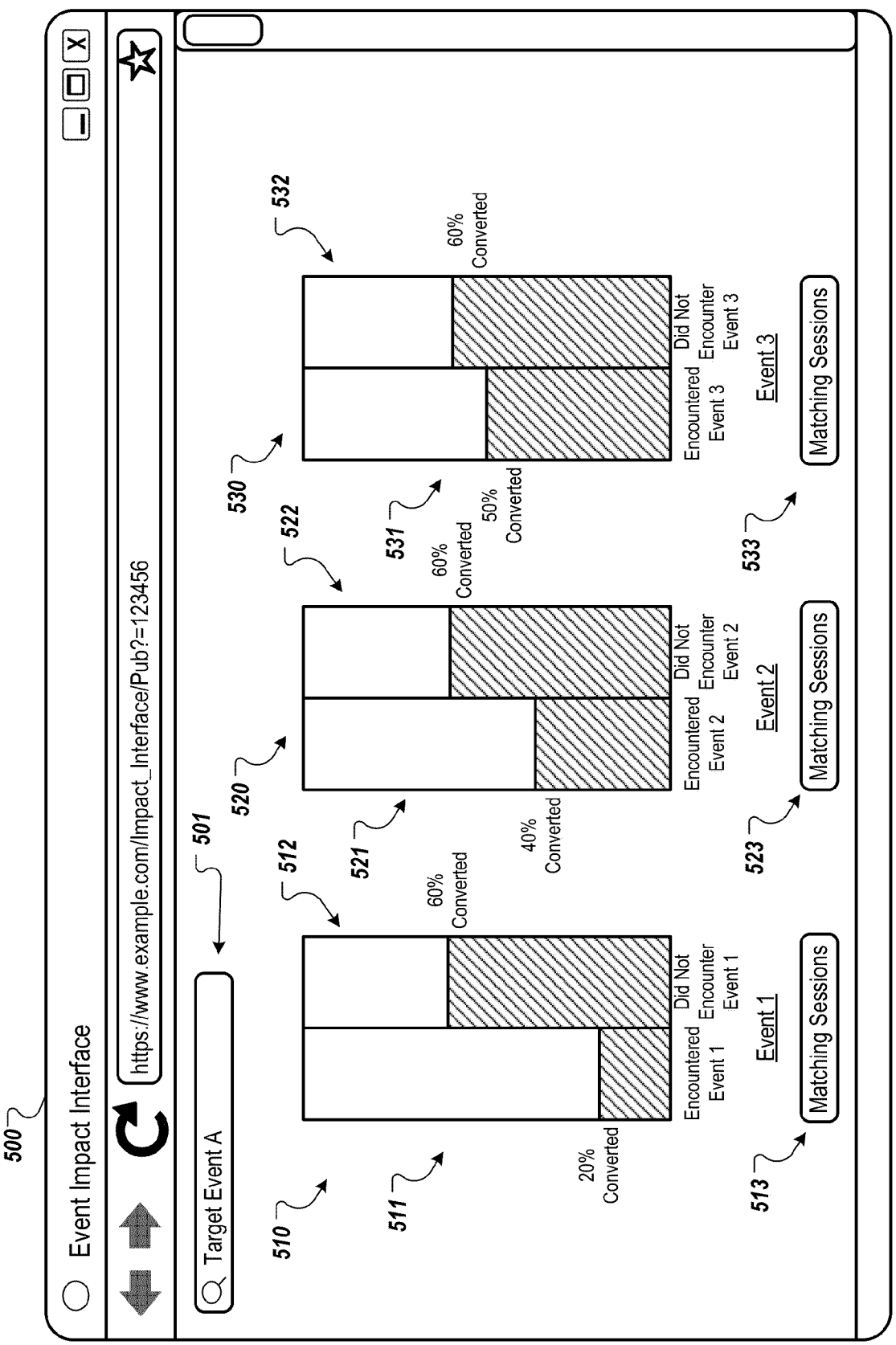
FIG. 5 is an illustration of an example user interface for presenting a visualization of the impact of events on a target outcome.

FIG. 5 is an illustration of an example interactive user interface 500 for presenting a visualization of the impact of events on a target outcome. As described above, the user interface 500 can be presented in response to user interaction with the visualization 415 of the user interface 400 of FIG. 4.

The user interface 500 includes a search element 501 that enables a user to search for event data for a target outcome. For example, after viewing the user interface 500 for target outcome A, the user may want to view similar data for another target outcome.

The user interface 500 also includes an impact visualization 510, 520, and 530 for events 1, 2, and 3 respectively. The events 1-3 can be events for which the impact of the event was determined for target outcome A. In another example, the events 1-3 can be the events that have the greatest impact on target outcome A. For example, more than three events may have been analyzed. The events can be ranked based on impact and impact visualizations for the top N events, in this example N=3, can be presented in the user interface 500.

The impact visualization 510 for event 1 includes a bar graph with a first bar 511 that represents the conversion rate for user sessions that included event 1 and a second bar 512 that represents the conversion rate for user sessions that did not include event 1. In this example, the conversion rate for user sessions that included event 1 is 20% and the conversion rate for user sessions that did not include event 1 is 60%.

Figure 6:
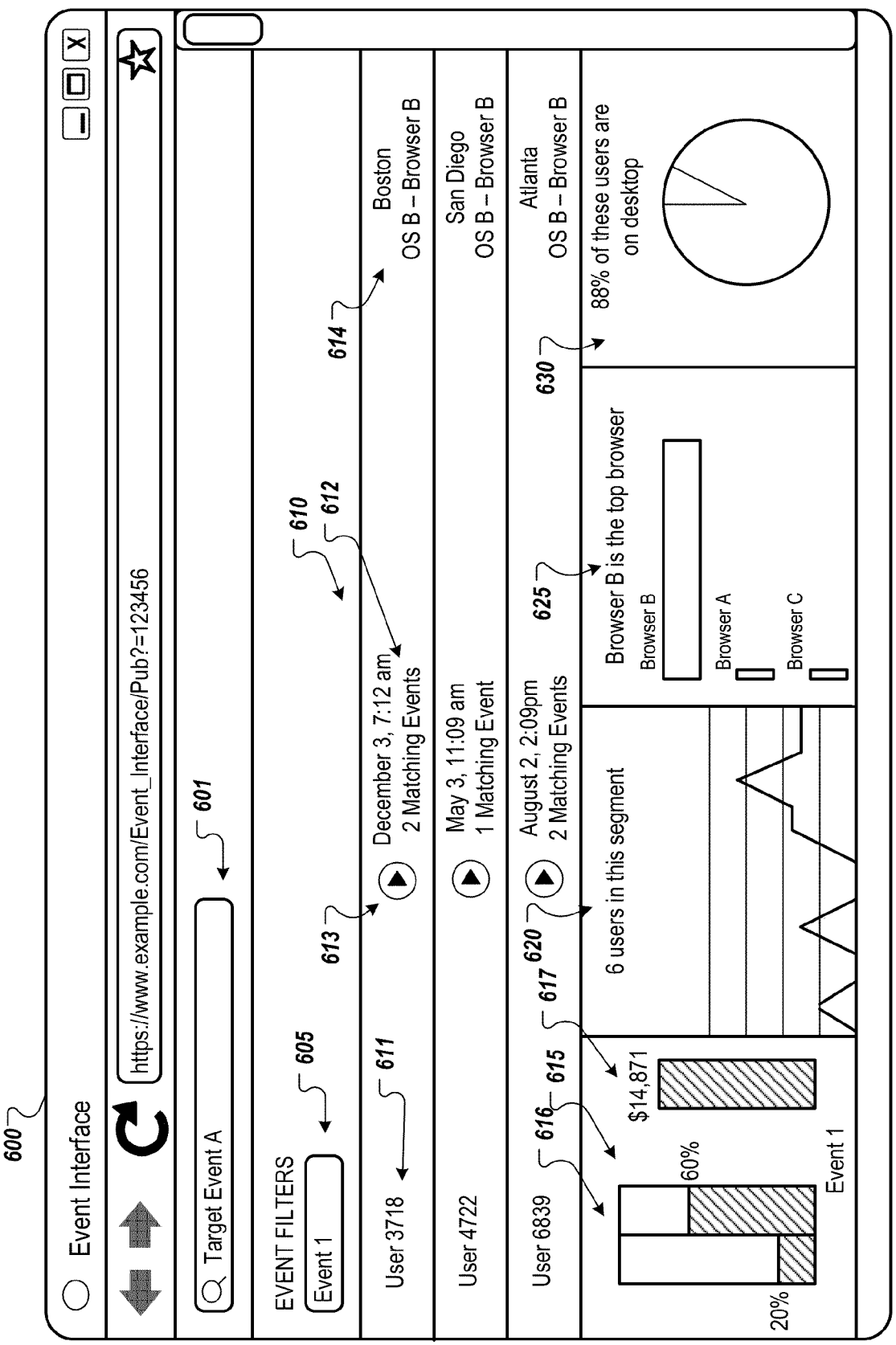
FIG. 6 is an illustration of an example user interface for presenting data related to a specified event.

The impact visualization 510 for event 1 also includes a matching sessions user interface control that, when interacted with, triggers presentation of a user interface that presents sessions that include event 1. An example of such a user interface is illustrated in FIG. 6 and described below.

The impact visualization 520 for event 2 includes a bar graph with a first bar 521 that represents the conversion rate for user sessions that included event 2 and a second bar 522 that represents the conversion rate for user sessions that did not include event 2. In this example, the conversion rate for user sessions that included event 2 is 40% and the conversion rate for user sessions that did not include event 2 is 60%. The impact visualization 520 for event 2 also includes a matching sessions user interface control that, when interacted with, triggers presentation of a user interface that presents sessions that include event 2.

The impact visualization 530 for event 3 includes a bar graph with a first bar 531 that represents the conversion rate for user sessions that included event 3 and a second bar 532 that represents the conversion rate for user sessions that did not include event 3. In this example, the conversion rate for user sessions that included event 3 is 50% and the conversion rate for user sessions that did not include event 3 is 60%. The impact visualization 530 for event 3 also includes a matching sessions user interface control that, when interacted with, triggers presentation of a user interface that presents sessions that include event 3.

A user can use this user interface to quickly identify the impact of various events on the occurrence of target outcome A. The user can view the impacts of these events on the conversion rates for target outcome A relative to the conversion rates for target outcome A for sessions that did not include the events. In this way, a user can quickly determine which events on which to focus to increase the conversion rate for user sessions that include lead-up events for target outcome A.

Although conversion rates are shown by FIG. 5 in this example, other unrealized metrics can be presented. For example, the impact visualization for each event can include a bar that indicates the amount of unrealized purchases determined for each event. Similarly, the visualizations of FIG. 5 can be used to present the impact of other measurable features.

FIG. 6 is an illustration of an example interactive user interface 600 for presenting data related to a specified event. The user interface 600 presents data related to a specified event for which the impact of the specified event on a target outcome (e.g., target outcome A) has been determined. The user interface 600 includes a search element 601 that enables a user to search for user sessions that include a target outcome and a specified event. Although FIG. 6 illustrates a user interface 600 for presenting data related to a specified event, a similar user interface can be used to present data related to other measurable features.

The user interface 600 also includes an event filter 605 that enable a user to filter the user sessions based on specified events for which the impact of the specified events has been determined. For example, the user interface 600 presents session elements 610 for user sessions that include event 1. If the user wants to view user sessions that include event 2 or event 3, the user can input event 1 or event 2 in the event filter 605.

Each session element 610 includes the user identifier 611 for the user of the user session. Each session element 610 also includes a playback user interface element 612 that includes a playback control 613, the date and time that the user session occurred, and the number of matching events in the user session. User selection of the playback control 613 for a user session triggers the playback of the user session.

This enables a user to view the user sessions that include an event that impacted the occurrence of the target outcome. For example, if event 1 is a particular error, the user can select the playback controls 613 for the user sessions presented in FIG. 6 to view the playback of the sessions that include the error. In this way, the user can see how the error affected the session and/or a user of the user session.

The user interface 600 also includes an event impact visualization 615 that presents the impact of event 1 on target outcome A. The event impact visualization 615 includes a bar graph 616 that indicates the conversion rate for matching user sessions (e.g., user sessions that include a lead-up event for target outcome A) that included event 1 and the conversion rate for matching user sessions that did not include event 1. The event impact visualization 615 also includes bar 617 that indicates the unrealized purchase amount caused by event 1. In this example, the unrealized purchase amount is $14,871. As described above, this amount can be determined by aggregating unrealized purchase amounts for matching user sessions that included event 1, but that did not include target outcome A.

The user interface 600 also includes a visualization 620 of the number of users in the segment that had a matching user session that included event 1. The visualization 620 includes a graph 621 that represents the changes in the number of users over time.

The user interface 600 also includes a visualization 625 that shows, for each type of web browser, the number of the matching user sessions that include event 1 and that were completed using the web browser. This visualization 625 enables a user to quickly determine on which web browser error 1 is occurring and causing the impact to target outcome A. In this example, event 1 is only occurring in user sessions completed using browser B. This can help a user to focus on why this event occurs on browser B rather than other browser.

Similarly, the user interface 600 includes a visualization 630 that shows, for each type of device (e.g., desktop or mobile), the number of the matching user sessions that include event 1, and that were completed on the type of device. This visualization can similarly help a user to focus on the type of device on which event 1 is occurring.

Although the visualizations 625 and 630 present data for web browsers, similar visualizations can be presented for other software and hardware. For example, similar visualizations can be presented for operation systems, application version, processor types, models of mobile device (e.g., smartphones), and/or other appropriate types of software and hardware.

Figure 7:
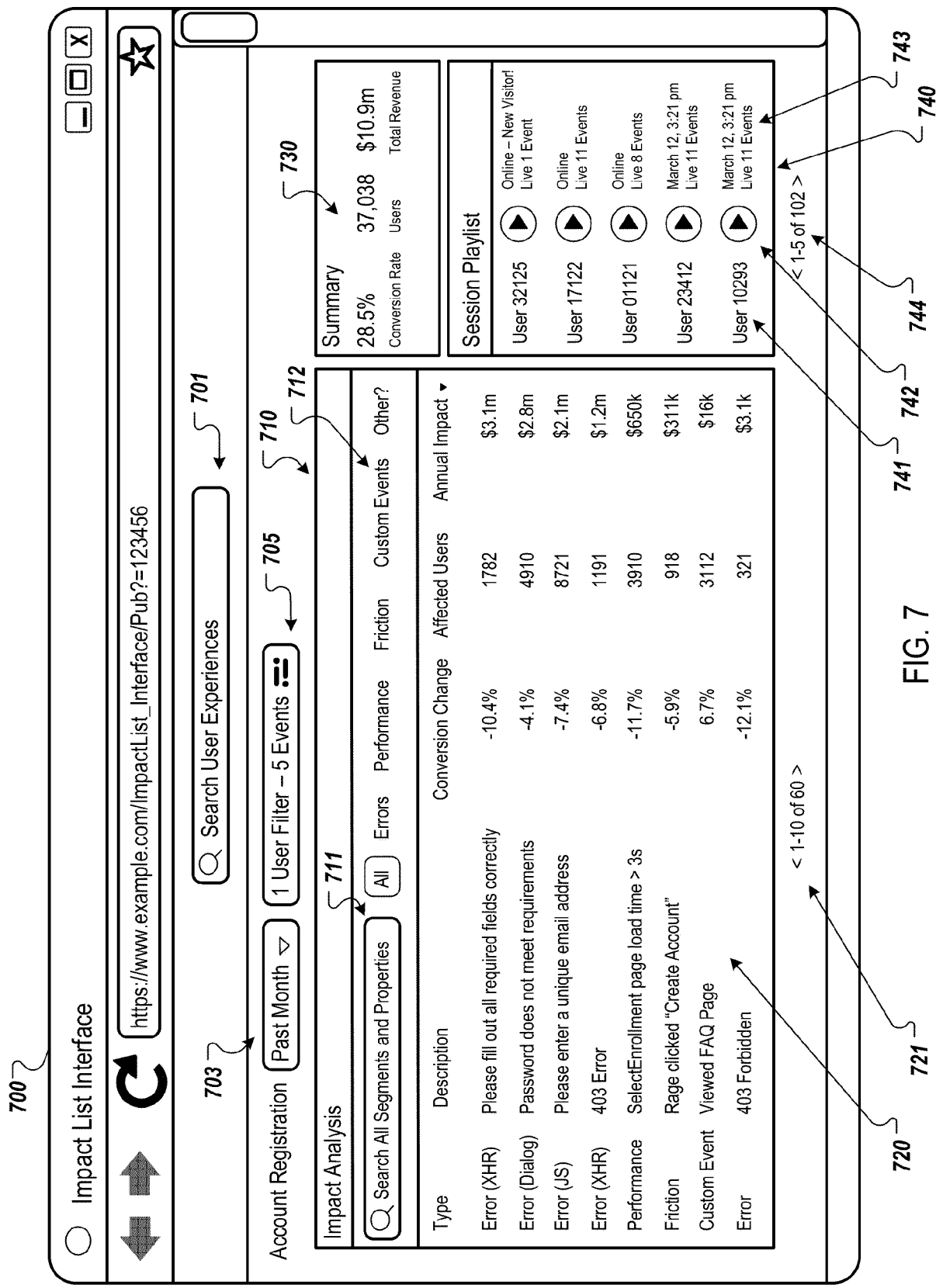
FIG. 7 is an illustration of an example user interface for presenting the results of an impact analysis for a target outcome.

FIG. 7 is an illustration of an example user interface 700 for presenting the results of an impact analysis for a target outcome. In particular, the user interface 700 presents the results of analyzing session data for a user interface that is used to create an account at a website. In this example, the target outcome is the presentation of a confirmation screen after a user successfully creates an account. The workflow for creating account can include a series of lead-up events that are required to occur prior to the target outcome. In this example, the lead-up events include a user clicking a join/login interface control, the user clicking a join now control, the user changing an email address in an email address interface element, and the user clicking a joinSubmit control.

The user interface 700 includes a search element 701 that enables a user to search for user sessions that include an event or other data. The user interface 700 also includes a time period filter element 703 that enables a user viewing the user interface 700 to specify a time period for the data presented by the user interface 700. In this example, the user interface presents data for user sessions that occurred in the last month. The user interface 700 also includes another filter 705 that enables a user to filter the data based on other criteria, e.g., geographic location of users, users in specified user groups, etc.

The user interface 700 also includes an impact analysis element 710. The impact analysis element 710 includes a session feature list 720 that includes a list of session features for which the impact of the session feature on the target outcome of viewing the confirmation screen has been analyzed. Each session feature in the session feature list 720 can be a session feature identified in at least one matching session that included at least one of the lead-up events. That is, each session feature may be a feature that was part of a user session in which a user entered the workflow for creating an account at the website.

For each session feature, the session feature list 720 also includes a description of the session feature, a conversion change (e.g., relative to the overall conversion percentage for the workflow for creating an account), a number of affected users that have been affected by the session feature (e.g., a number of users that had a user session that included the session feature), and an annual impact of the session feature on the target outcome of confirming an account. The session feature list 720 includes, as session features, errors (e.g., Error (XHR) for filling out required fields correctly) and other measurable features (e.g., performance of SelectEnrollment page load time).

The session feature list 720 can present the session features in a ranked order based on the impact the session feature has on the target outcome. In this example, the session feature list 720 presents the session features in order based on the annual impact of the session feature on the target outcome of confirming creation of an account. For example, the error related to users filling out all required fields correctly has the greatest annual impact and is presented at the top of the session feature list 720.

The impact analysis element 710 also includes a search element 711 that enables a user to search for the impact of particular segments of users or other properties of the sessions. If a query is entered into the search element 711, the session features included in the sessions feature list can be updated to present the impact of sessions that match the query.

The impact analysis element 710 also includes a menu bar 712 that enables a user to view the impact of particular types of session features. In this example, the session feature list 720 includes all types of user session features. If the "Errors" menu element is selected, the session feature list 720 can be updated to only present sessions features (and their respective data) that are classified as errors. The session feature list can be similarly adjusted for the other menu elements, i.e., for session features classified as performance features, for session features classified as friction events (e.g., mouse rage), for session features classified as custom events, and for session features classified as something other than errors, performance, friction, or custom events.

The user interface 700 also includes a summary element 730 that presents a summary of information for the target outcome of confirming an account. The summary element 730 includes an overall conversion rate for the workflow for creating an account (e.g., a percentage of the sessions in which one of the lead-up events occurred that also included the target outcome). The summary element 730 also includes a total number of users that entered the workflow for creating an account by performing one of the lead-up events and a total amount of revenue generated by sessions that included the target outcome. The information in the summary element 730 is based on the filters 703 and 705. For example, the information in the summary element 730 is for the past month in the illustrated example.

The user interface 700 also includes a session playlist 740. The session playlist 740 includes a list of matching sessions that include at least one of the lead-up events. The session playlist 740 enables a user to view the playback of the user sessions. For example, the session playlist 740 includes, for each session, a user identifier 741 for a user of the session, a playback control 742 that, when interacted with, triggers playback of the session, and user data 743 that specifies the last time the user was involved in a session with the user interface of the website and a number of events that have occurred for the user.

If the user selects a menu element from the menu bar 712, the sessions included in the session playlist 740 can also be updated to only include sessions that included the particular type of session feature specified by the selected menu element. In this way, a user can view the playback of sessions that included particular types of session features to determine why the particular type of session feature is causing the impact on the target outcome.

The user interface 700 includes paging elements 721 and 744. The paging element 721 enables a user to view additional pages of session features that are lower in the ranking. The paging element 744 enables a user to view additional pages of sessions in the session playlist 740.

Figure 8:
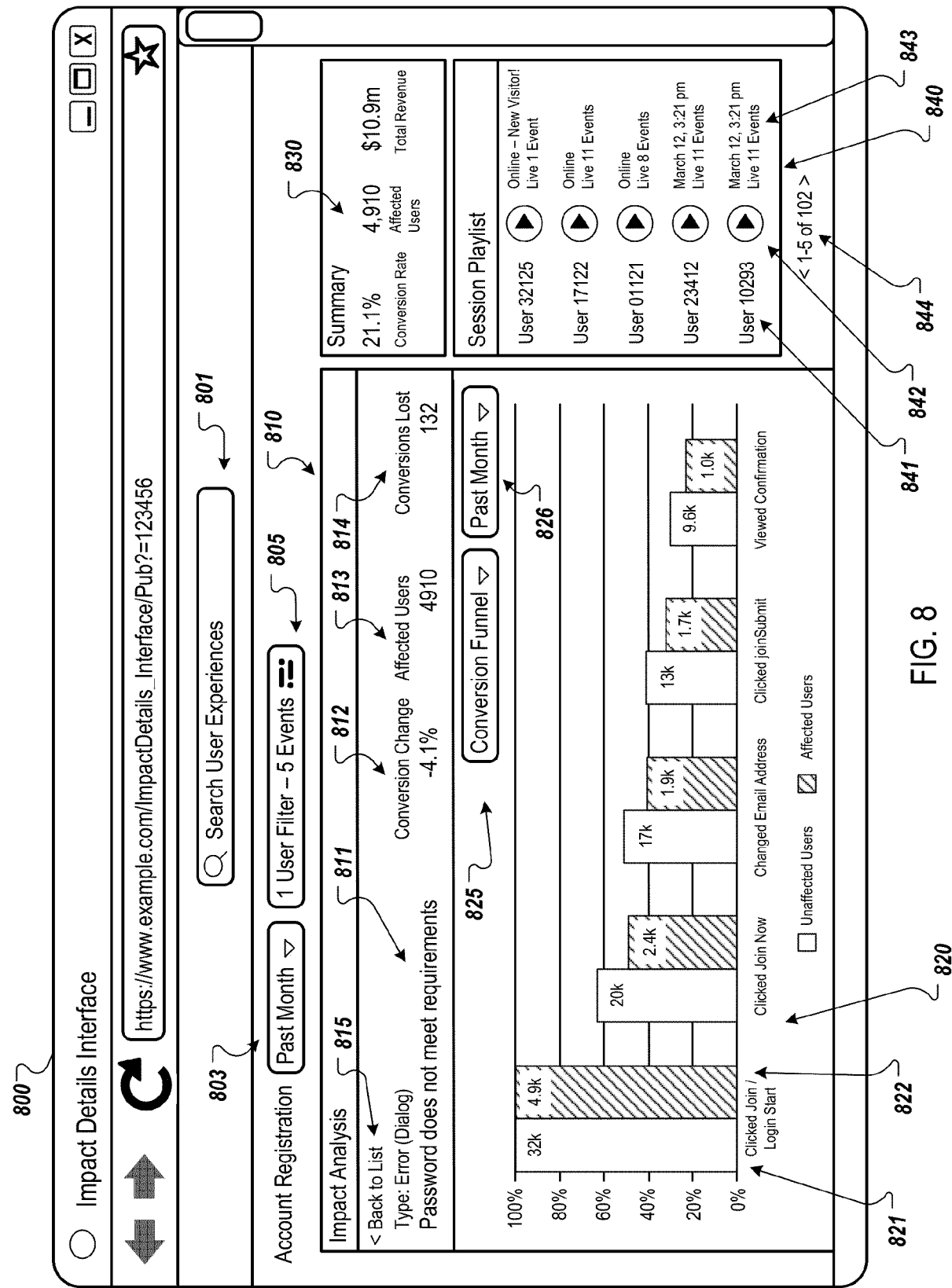
FIG. 8 is an illustration of an example user interface for presenting the effects of a session feature on a set of sequential events.

FIG. 8 is an illustration of an example user interface 800 for presenting the effects of a session feature on a set of sequential events. The user interface 800 can be presented in response to interaction with, e.g., selection of, a session feature in the session feature list 720 of FIG. 7. The user interface 800 presents additional data for the selected session feature. In this example, the session feature is the error related to a user entering a password that does not meet the requirements for a password at a website.

Similar to the user interface 700 of FIG. 7, the user interface 800 includes a search element 801 that enables a user to search for user sessions that include an event or other data, a time period filter element 803 that enables a user viewing the user interface 800 to specify a time period for the data presented by the user interface 800, and another filter 805 that enables a user to filter the data based on other criteria, e.g., geographic location of users, users in specified user groups, etc.

The user interface 800 also includes an impact analysis element 810 that includes data related to the impact of the session feature on events in the workflow for creating an account described above with reference to FIG. 7. In particular, the impact analysis element 810 includes the description 811 of the session feature, a conversion change 812 for the session feature, a number of users 813 affected by the session feature (e.g., a number of users that encountered the password requirement error), and a number of conversions lost 814 in sessions that included the session feature. The conversion change can be the difference between the overall conversion rate for all sessions that included a lead-up event and the conversion rate for sessions that included the session feature. The impact analysis element 810 also includes a return control 815 that, when interacted with causes the browser or other application presenting the user interface 800 to navigate back to the user interface 700 of FIG. 7.

The impact analysis element 810 includes a bar graph 820 that includes, for each lead-up event and the target outcome (viewed confirmation), a first bar 821 that represents the percentage of unaffected users that entered the workflow that also encountered the event. An unaffected user is a user for which the session of the user did not include the session feature, e.g., the password requirement error. The bar graph 820 also includes, for each event, a second bar 822 with hatching that represents the percentage of affected users that entered the workflow that also encountered the event. Each bar also includes a number of the users represented by the bar, e.g., approximately 19,000 unaffected users clicked "Join Now."

The bar graph 820 allows a user to view the difference in how far affected users made it in the workflow for creating an account relative to how far unaffected users made it in the workflow. This also allows a user to quickly determine at what point in the workflow affected users exit the workflow due to the session feature, relative to the point at which unaffected users exit. In this example, affected and unaffected users trend downwards at similar rates from the beginning to the ending of the workflow.

The impact analysis element 810 also includes a conversion funnel dropdown menu 825 that enables a user to select a different funnel (e.g., workflow that includes lead-up events and a target outcome). The impact analysis element 810 also includes a time period filter element 826 that enables a user to specify a time period for the bar graph 820. In this example, the bar graph 820 represents the conversion percentages and the number of users in each bar for the past month.

The user interface 800 also includes a summary element 830 that presents a summary of information for the session feature, e.g., for the password requirement error. The summary element 830 includes a conversion rate for the user sessions that included the session feature. The summary element 830 also includes a total number of users for which the user's session included the session feature and a total amount of revenue generated by sessions that included the target outcome. The information in the summary element 830 is based on the filters 803 and 805. For example, the information in the summary element 830 is for the past month in the illustrated example.

The user interface 800 also includes a session playlist 840. The session playlist 840 includes a list of matching sessions that included the session feature, e.g., the password requirement error. The session playlist 840 enables a user to view the playback of the user sessions that included the session feature. For example, the session playlist 840 includes, for each session, a user identifier 841 for a user of the session, a playback control 842 that, when interacted with, triggers playback of the session, and user data 843 that specifies the last time the user was involved in a session with the user interface of the website and a number of events that have occurred for the user. The user interface 800 also includes a paging element 844 that enables a user to view additional pages of sessions in the session playlist 840.

FIG. 9 is an illustration of an example user interface 900 for presenting additional data related to the effects of an event on a set of sequential events. In some implementations, the content of the user interface 900 can be presented with the user interface 800. For example, the content of the user interface 900 can be presented below the content of the user interface 800. The user interface 900 includes a search element 801 that enables a user to search for user sessions that include an event or other data.

The user interface 902 also includes an impact table 910 that includes a row for each user segment and a column for each event in a set of sequential events of the workflow for creating account described above. In this example, the impact table 910 includes a row for unaffected users for which the session of the user did not include the session feature, e.g., the password requirement error, and a row for affected users for which the session of the user did include the session feature. The data in the table 910 corresponds to the data in the bar graph 820 of FIG. 8.

In the row for the unaffected users, the cell for each event includes the number of unaffected users that reached the event and, for some evens, the percentage of unaffected users that reached the event. In the row for the affected users, the cell for each event includes the number of affected users that reached the event and, for some events, the percentage of the affected users that reached the event.

The user interface 900 also includes a menu bar 902 that enables a user to view the impact of particular types of session features. In this example, the table 902 includes the number of users and the percentages of users for all user sessions that include at least one of the lead-up events. A user can select one of the menu elements in the menu bar to view similar data based on the dimension corresponding to the selected menu element. For example, if the user selects the "User Properties" menu element, the table 910 can be updated to present similar data based on various user segments, as described below with reference to FIG. 11.

The user interface 900 also includes a screen resolution breakdown visualization 920, an errors visualization 930, and a browser breakdown visualization 940. The screen resolution breakdown visualization 920 includes data related to the conversion rates for the target outcome of creating an account based on the resolution of the display screen of the devices at which a user session that included at least one of the lead-up events occurred. For each screen resolution, the screen resolution breakdown visualization 920 includes the conversion rate for the screen resolution and a number of users that used a device with the screen resolution. The screen resolutions are ranked and ordered based on their impact, i.e., based on their respective conversion rates.

The screen resolution breakdown visualization 920 also includes a bar 921 for each resolution. The bar 921 for the highest ranked screen resolution is filled to the end. The bar 921 for each other screen resolution is filled based on the ratio between the conversion rate for that screen resolution and the conversion rate for the highest ranked screen resolution.

The errors visualization 930 includes data related to the conversion rates for the target outcome of creating an account based on the errors that occurred in user sessions that included at least one of the lead-up events. For each error, the errors visualization 930 includes the conversion rate for the error and a number of users encountered the error. The errors are ranked and ordered based on their impact, i.e., based on their respective conversion rates.

The errors visualization 930 also includes a bar 931 for each error. The bar 931 for the highest ranked error is filled to the end. The bar 931 for each other error is filled based on the ratio between the conversion rate for that error and the conversion rate for the highest ranked error.

The browser breakdown visualization 940 includes data related to the conversion rates for the target outcome of creating an account based on the web browser used to present the user interface for user sessions that included at least one of the lead-up events. For each web browser, the browser breakdown visualization 940 includes the conversion rate for the web browser and a number of users that used the web browser for one of the user sessions that included at least one of the lead-up events. The web browser are ranked and ordered based on their impact, i.e., based on their respective conversion rates.

The browser breakdown visualization 940 also includes a bar 941 for each resolution. The bar 921 for the highest ranked screen resolution is filled to the end. The bar 921 for each other screen resolution is filled based on the ratio between the conversion rate for that screen resolution and the conversion rate for the highest ranked screen resolution.

Figure 10:
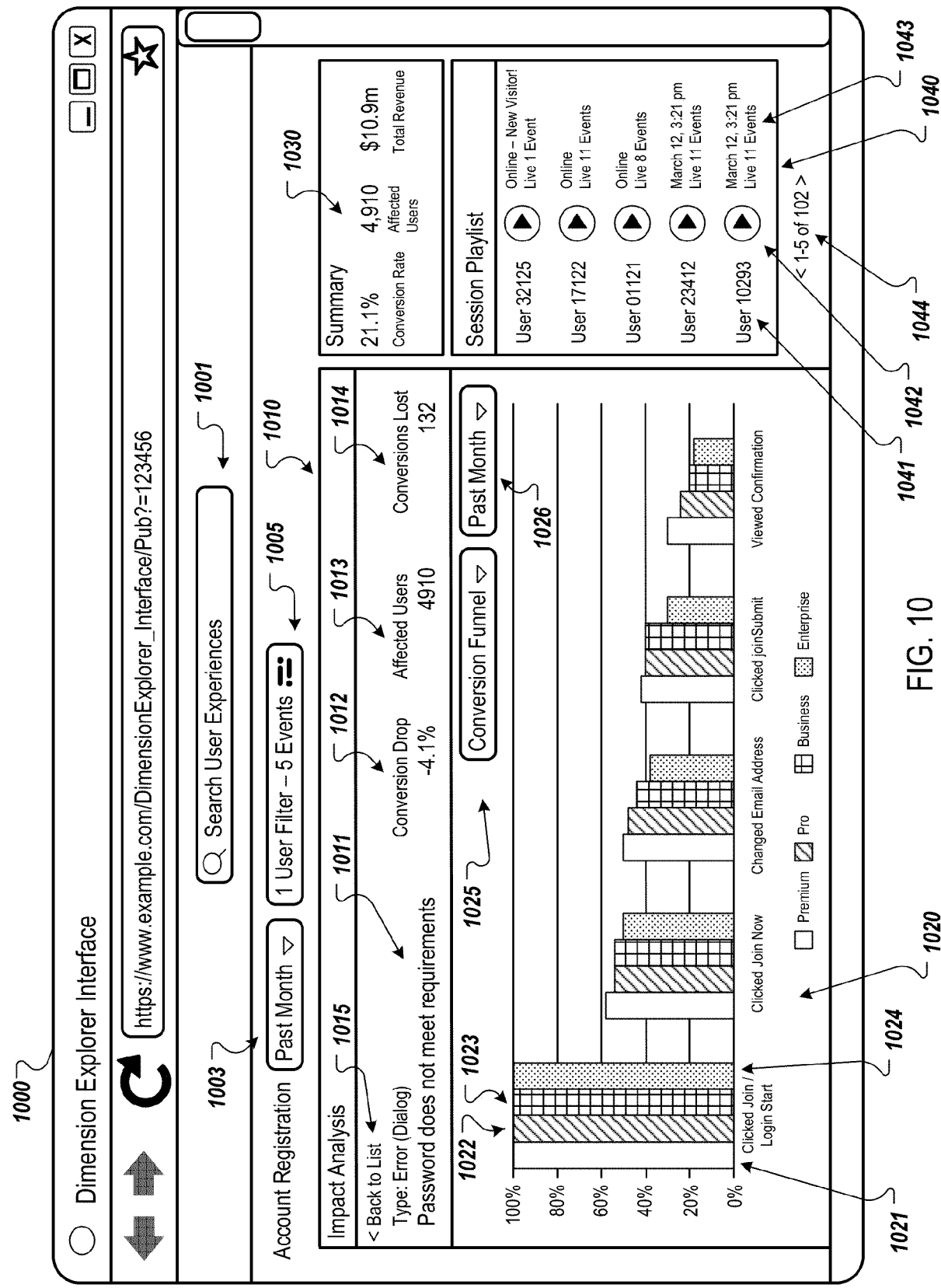
FIG. 10 is an illustration of an example user interface for presenting the effects of user dimensions on a set of sequential events.

FIG. 10 is an illustration of an example user interface 1000 for presenting the effects of user dimensions on a set of sequential events. The user interface 1000 includes many of the same elements as the user interface 800 of FIG. 8, but presents the visualization of the impact of user dimensions on the target outcome. For example, the user interface 1000 includes a search element 1001, a time period filter element 1003 that enables a user viewing the user interface 1000 to specify a time period for the data presented by the user interface 1000, and another filter 1005 that enables a user to filter the data based on other criteria, e.g., geographic location of users, users in specified user groups, etc.

The user interface 1000 also includes a summary element 1030 with the same content as the summary element 830 of FIG. 8. Similarly, the user interface 1000 includes a session playlist 1040 that is similar to the session playlist 840. The session playlist 1040 includes a list of matching sessions that included the session feature, e.g., the password requirement error. The session playlist 1040 also includes, for each session, a user identifier 1041 for a user of the session, a playback control 1042 that, when interacted with, triggers playback of the session, and user data 1043 that specifies the last time the user was involved in a session with the user interface of the website and a number of events that have occurred for the user. The user interface 1000 also includes a paging element 1044 that enables a user to view additional pages of sessions in the session playlist 1040.

The user interface 1000 also includes an impact analysis element 1010 that includes data related to the impact of a session feature, e.g., the password requirement error, on events in the workflow for creating an account described above with reference to FIG. 7. In particular, the impact analysis element 1010 includes the description 1011 of the session feature, a conversion change 1012 for the session feature, a number of users 1013 affected by the session feature (e.g., a number of users that encountered the password requirement error), and a number of conversions lost 1014 in sessions that included the session feature. The impact analysis element 1010 also includes a return control 1015 that, when interacted with causes the browser or other application presenting the user interface 1000 to navigate back to the user interface 700 of FIG. 7.

The impact analysis element 1010 includes a bar graph 1020 that presents the impact of the session feature based on user dimensions. In this example, the bar graph 1020 presents the impact of the session feature based on a classification for the users, e.g., premium users, pro users, business users, and enterprise users.

The bar graph 1020 includes, for each lead-up event and the target outcome (viewed confirmation), a first bar 1021 that represents the percentage of premium users that entered the workflow that also encountered the event. The bar graph 1020 also includes, for each event, a second bar 1022 with hatching that represents the percentage of pro users that entered the workflow that also encountered the event. The bar graph 1020 also includes, for each event, a third bar 1023 with hatching that represents the percentage of business users that entered the workflow that also encountered the event. The bar graph 1020 also includes, for each event, a fourth bar 1024 with hatching that represents the percentage of enterprise users that entered the workflow that also encountered the event. This bar graph 1020 allows users to compare the impact that an event or other session feature has on different types of users or other dimensions.

The impact analysis element 810 also includes a conversion funnel dropdown menu 1025 that enables a user to select a different funnel (e.g., workflow that includes lead-up events and a target outcome). The impact analysis element 1010 also includes a time period filter element 1026 that enables a user to specify a time period for the bar graph 1020.

Figure 11:
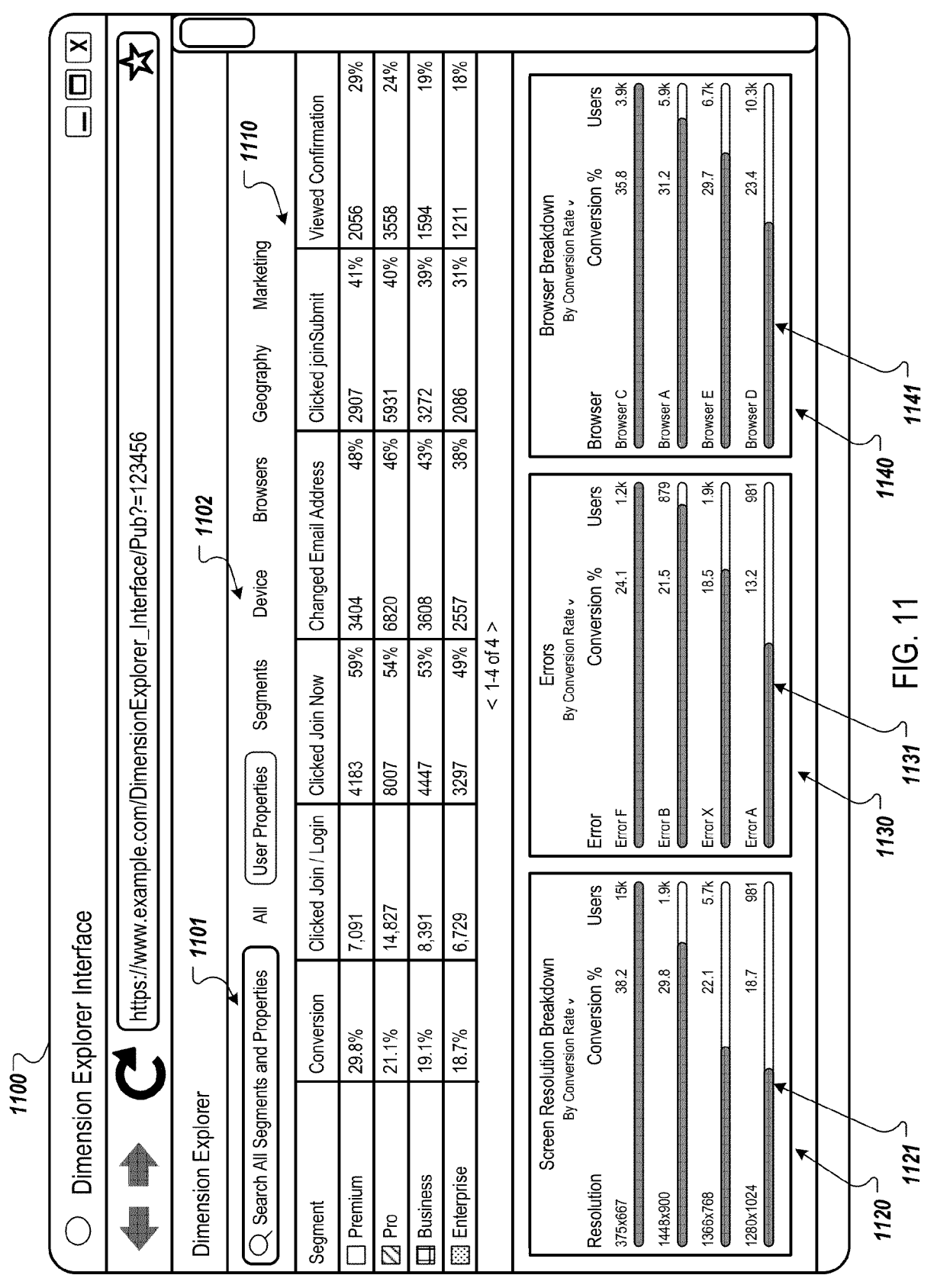

FIG. 11 is an illustration of an example user interface 1100 for presenting additional related to the effects of user dimensions on a set of sequential events. In some implementations, the content of the user interface 1100 can be presented with the user interface 1000. For example, the content of the user interface 1100 can be presented below the content of the user interface 1000.

The user interface 1100 includes many of the same elements as the user interface 900 of FIG. 9, but presents the visualization of the impact of user dimensions on the target outcome. For example, the user interface 1100 includes a search element 1101 that enables a user to search for user sessions that include an event or other data. The user interface 1100 also includes a menu bar 1102 that enables a user to view the impact of particular types of session features, similar to the menu bar 902 of FIG. 9.

The user interface 1100 also includes an impact table 1110 that includes a row for each user segment and a column for each event in a set of sequential events of the workflow for creating account described above. In this example, the impact table 1110 includes a respective row for premium users, pro users, business users, and enterprise users. The data in the table 1110 corresponds to the data in the bar graph 1020 of FIG. 10. In the row for the each user segment, the cell for each event includes the number of users in that segment that reached the event and for which the user session for the user included the session feature, e.g., the password requirement error. For some events, the cell for the event also includes percentage of users in that segment that reached the event in user sessions that included the session feature.

The user interface 1100 also includes a screen resolution breakdown visualization 1120, an errors visualization 1130, and a browser breakdown visualization 1140. The screen resolution breakdown visualization 1120 can present the same or similar data as the screen resolution breakdown visualization 920 of FIG. 9. Similarly, the errors visualization 1130 can present the same or similar data as the errors visualization 930 of FIG. 9 and the browser breakdown visualization 1140 can present the same or similar data as the browser breakdown visualization 940 of FIG. 9.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A system comprising:
a data store; and
one or more computers that interact with the data store and execute instructions that cause the one or more computers to perform operations comprising:
defining a set of sequential events including a target outcome and a series of lead-up events that are required to occur prior to the target outcome;
identifying session data for each of a plurality of user sessions with one or more user interfaces of a resource, wherein the session data for each user session comprises event data indicating changes to a document object model (DOM) of the resource that occurred during the user session;
identifying, by evaluating the event data indicating the changes to the DOM of the resource for each of the plurality of user sessions, (i) a first set of matching sessions during which one or more of the lead-up events were performed and during which the target outcome was reached and (ii) a second set of matching sessions during which one or more of the lead-up events occurred but during which the target outcome was not reached;
determining, by examining the session data for each of the matching sessions in the second set of matching sessions, a quantity of the matching sessions in the second set of matching sessions that included a specified session feature comprising a particular error that prevented the second set of the matching sessions from reaching the target outcome;
determining, for the second set of matching sessions, an aggregate impact of the specified session feature on the target outcome based on an aggregation of an unrealized metric of each matching session in the second set of matching sessions that included the specified session feature, but did not include the target outcome, wherein the unrealized metric for each matching session comprises a non-completed purchase amount that would have been realized if the target outcome was reached in the matching session and the aggregate impact comprises a sum of the non-completed purchase amounts across the second set of matching sessions; and
generating an interactive user interface that includes a visualization of the impact of the particular error, a list of matching sessions that included the particular error, and for each matching sessions in the list of matching sessions, an interactive control that triggers presentation of the matching session that included the particular error, but did not include the target outcome;
detecting user interaction with the interactive control for a given matching session in the list of matching sessions; and
generating and displaying playback of the given matching session that shows visual changes to the one or more user interfaces of the resource as they occurred during the given matching session, the generating comprising analyzing the changes to the DOM that occurred during the given matching session and reconstructing a structure of each user interface throughout the given matching session based on the changes to the DOM.

2. The system of claim 1, wherein the specified session feature is an event that occurred during each of the matching sessions.

3. The system of claim 1, wherein the specified session feature is a user interface error that prevented occurrence of the target outcome.

4. The system of claim 3, wherein the user interface error is defined by a user input.

5. The system of claim 3, wherein the operations comprise learning the user interface error from the session data for the plurality of user sessions.

6. The system of claim 3, wherein the operations comprise:
generating, for each type of error, a group that includes sessions in which an error of the type of error occurred; and
determining, for each type of error, an impact of the type of error on the target outcome based on an unrealized metric of the sessions in the group for the type of error that included at least one error of the type of error, but did not include the target outcome.

7. The system of claim 1, wherein the specified session feature comprises a specified user dimension, the specified user dimension being at least one of (i) a characteristic of a user of a session or (ii) a characteristic of a user device for which the session occurred.

8. The system of claim 1, wherein the interactive user interface includes a second control that triggers presentation of other session features related to the matching sessions, the operations further comprising:
  detecting user interaction with the second control and, in response:
    identifying, in the matching sessions, other session features included in the matching sessions, each of the other session features being different from the specified session feature; and
    updating the interactive user interface to present one or more of the other session features.

9. The system of claim 1, wherein the session data includes, for each session, data specifying at least one of hardware or software corresponding to a device at which the session occurred, the operations further comprising:
  identifying, in matching sessions that include the specified session feature, hardware or software of the device on which the matching session occurred; and
  generating an additional user interface that presents data specifying the hardware or software of the device on which the matching session occurred.

10. The system of claim 1, wherein the operations comprise:
  determining, for each of one or more additional session features, an impact of the additional specified session feature on the target outcome based on an additional unrealized metric of matching sessions that included the additional specified session feature, but did not include the target outcome;
  ranking the specified session feature and the one or more additional specified session features based on the impact of the specified session feature and the impact of each of the one or more additional specified session features; and
  generating an additional user interface that presents the ranking.

11. The system of claim 10, wherein the operations comprise:
  detecting a user selection of a given session feature in the ranking; and
  generating a second additional user interface that presents additional data for the selected session feature.

12. The system of claim 1, wherein determining the aggregate impact of the specified session feature on the target outcome comprises extracting the purchase amount from DOM of the resource for each matching session in the second set of matching sessions.

13. A method, comprising:
  defining, by one or more processors, a set of sequential events including a target outcome and a series of lead-up events that are required to occur prior to the target outcome;
  identifying session data for each of a plurality of user sessions with one or more user interfaces of a resource, wherein the session data for each user session comprises event data indicating changes to a document object model (DOM) of the resource that occurred during the user session;
  identifying, by the one or more processors and by evaluating the event data indicating the changes to the DOM of the resource for each of the plurality of user sessions, (i) a first set of matching sessions during which one or more of the lead-up events were performed and for which the target outcome was reached and (ii) a second set of matching sessions during which one or more of the lead-up events occurred but during which the target outcome was not reached;
  determining, by examining the session data for each of the matching sessions in the second set of matching sessions, a quantity of the matching sessions in the second set of matching sessions that included a specified session feature comprising a particular error that prevented the second set of the matching sessions from reaching the target outcome;
  determining, by the one or more processors and for the second set of matching sessions, an aggregate impact of the specified session feature on the target outcome based on an aggregation of an unrealized metric of each matching session in the second set of matching sessions that included the specified session feature, but did not include the target outcome, wherein the unrealized metric for each matching session comprises a non-completed purchase amount that would have been realized if the target outcome was reached in the matching session and the aggregate impact comprises a sum of the non-completed purchase amounts across the second set of matching sessions; and
  generating, by the one or more processors, an interactive user interface that includes a visualization of the impact of the particular error, a list of matching sessions that included the particular error, and for each matching sessions in the list of matching sessions, an interactive control that triggers presentation of the matching session that included the particular error, but did not include the target outcome;
  detecting user interaction with the interactive control for a given matching session in the list of matching sessions; and
  generating and displaying playback of the given matching session that shows visual changes to the one or more user interfaces of the resource as they occurred during the given matching session, the generating comprising analyzing the changes to the DOM that occurred during the given matching session and reconstructing a structure of each user interface throughout the given matching session based on the changes to the DOM.

14. The method of claim 13, wherein the specified session feature is at least one of (i) an event that occurred during each of the matching sessions or (ii) a user interface error that prevented occurrence of the target outcome.

15. The method of claim 14, wherein the user interface error is defined by a user input.

16. The method of claim 14, further comprising learning the user interface error from the session data.

17. The method of claim 14, further comprising:
  generating, for each type of error, a group that includes sessions in which an error of the type of error occurred; and
  determining, for each type of error, an impact of the type of error on the target outcome based on an unrealized metric of the sessions in the group for the type of error that included at least one error of the type of error, but did not include the target outcome.

18. The method of claim 13, wherein the specified session feature comprises a specified user dimension, the specified user dimension being at least one of (i) a characteristic of a user of a session or (ii) a characteristic of a user device for which the session occurred.

19. The method of claim 13, wherein the interactive user interface includes a second control that triggers presentation of other session features related to the matching sessions, the method further comprising:
  detecting user interaction with the second control and, in response:

identifying, in the matching sessions, other session feature included in the matching sessions, each of the other session features being different from the specified session feature; and updating the interactive user interface to present one or more of the other session features.

20. A non-transitory computer readable medium storing instructions that upon execution by one or more computers cause the one or more computers to perform operations comprising:

defining a set of sequential events including a target outcome and a series of lead-up events that are required to occur prior to the target outcome;

identifying session data for each of a plurality of user sessions with one or more user interfaces of a resource, wherein the session data for each user session comprises event data indicating changes to a document object model (DOM) of the resource that occurred during the user session;

identifying, by evaluating the event data indicating the changes to the DOM of the resource for each of the plurality of user sessions, (i) a first set of matching sessions during which one or more of the lead-up events were performed and during which the target outcome was reached and (ii) a second set of matching sessions during which one or more of the lead-up events occurred but during which the target outcome was not reached;

determining, by examining the session data for each of the matching sessions in the second set of matching sessions, a quantity of the matching sessions in the second set of matching sessions that included a specified session feature comprising a particular error that prevented the second set of the matching sessions from reaching the target outcome;

determining, for the second set of matching sessions, an aggregate impact of the specified session feature on the target outcome based on an aggregation of an unrealized metric of each matching session in the second set of matching sessions that included the specified session feature, but did not include the target outcome, wherein the unrealized metric for each matching session comprises a non-completed purchase amount that would have been realized if the target outcome was reached in the matching session and the aggregate impact comprises a sum of the non-completed purchase amounts across the second set of matching sessions; and generating an interactive user interface that includes a visualization of the impact of the particular error, a list of matching sessions that included the particular error, and for each matching sessions in the list of matching sessions, an interactive control that triggers presentation of the matching session that included the particular error, but did not include the target outcome;

detecting user interaction with the interactive control for a given matching session in the list of matching sessions; and generating and displaying playback of the given matching session that shows visual changes to the one or more user interfaces of the resource as they occurred during the given matching session, the generating comprising analyzing the changes to the DOM that occurred during the given matching session and reconstructing a structure of each user interface throughout the given matching session based on the changes to the DOM.

* * * * *